(12) United States Patent
Chen et al.

(10) Patent No.: US 11,948,271 B2
(45) Date of Patent: Apr. 2, 2024

(54) MACHINE LEARNING TECHNIQUES FOR VIDEO DOWNSAMPLING

(71) Applicant: NETFLIX, INC., Los Gatos, CA (US)

(72) Inventors: Li-Heng Chen, Austin, TX (US); Christos G. Bampis, Los Gatos, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 432 days.

(21) Appl. No.: 17/133,206

(22) Filed: Dec. 23, 2020

(65) Prior Publication Data

US 2022/0198607 A1   Jun. 23, 2022

(51) Int. Cl.
| | |
|---|---|
| *G06T 3/40* | (2006.01) |
| *G06N 3/084* | (2023.01) |
| *G06T 3/4046* | (2024.01) |
| *G06T 9/00* | (2006.01) |

(52) U.S. Cl.
CPC ........... *G06T 3/4046* (2013.01); *G06N 3/084* (2013.01); *G06T 9/002* (2013.01)

(58) Field of Classification Search
CPC ......... G06T 2207/20081; G06T 3/4046; G06T 9/00; G06T 9/002; G06N 3/04; G06N 3/045; G06N 3/08; G06N 3/084; G06N 20/00; H04N 21/2662; H04N 13/161
See application file for complete search history.

(56) References Cited

U.S. PATENT DOCUMENTS

| | | | | |
|---|---|---|---|---|
| 11,153,566 B1* | 10/2021 | Tao | ..................... | H04N 19/124 |
| 11,200,644 B2* | 12/2021 | Ryan | ..................... | G06T 5/10 |
| 11,373,426 B2* | 6/2022 | Gu | ..................... | G06V 10/462 |
| 11,563,986 B1* | 1/2023 | Bampis | ..................... | G06N 3/04 |

(Continued)

FOREIGN PATENT DOCUMENTS

CN         109242919 A       1/2019

OTHER PUBLICATIONS

International Search Report for Application No. PCT/US2021/063687 dated May 10, 2022.

(Continued)

*Primary Examiner* — Ian L Lemieux
(74) *Attorney, Agent, or Firm* — Artegis Law Group, LLP

(57) ABSTRACT

In various embodiments, a training application trains a convolutional neural network to downsample images in a video encoding pipeline. The convolution neural network includes at least two residual blocks and is associated with a downsampling factor. The training application executes the convolutional neural network on a source image to generate a downsampled image. The training application then executes an upsampling algorithm on the downsampled image to generate a reconstructed image having the same resolution as the source image. The training application computes a reconstruction error based on the reconstructed image and the source image. The training application updates at least one parameter of the convolutional neural network based on the reconstruction error to generate a trained convolutional neural network. Advantageously, the trained convolution neural network can be implemented in a video encoding pipeline to mitigate visual quality reductions typically experienced with conventional video encoding pipelines that implement conventional downsampling techniques.

27 Claims, 6 Drawing Sheets

(56) References Cited

U.S. PATENT DOCUMENTS

| | | | |
|---|---|---|---|
| 2018/0122048 A1 | 5/2018 | Wang et al. | |
| 2020/0126187 A1* | 4/2020 | Park et al. | |
| 2021/0279509 A1* | 9/2021 | Meng | G06N 3/045 |
| 2022/0108425 A1* | 4/2022 | Chen | G06T 3/4053 |
| 2022/0400270 A1* | 12/2022 | Meardi | H04N 19/136 |
| 2023/0052483 A1* | 2/2023 | Cai | G06N 3/048 |

OTHER PUBLICATIONS

Odena et al., "Deconvolution and Checkerboard Artifacts", https://distill.pub/2016/deconv-checkerboard/, 9 pages.

Li et al., "Learning a Convolutional Neural Network for Image Compact-Resolution", https://sce.umkc.edu/faculty-sites/izhu/papers/tip18-li-sr.pdf, 16 pages.

Timofte et al., DIV2K dataset: DIVerse 2K resolution high quality images as used for the challenges @ NTIRE (CVPR 2017 and CVPR 2018) and @ PIRM (ECCV 2018), https://data.vision.ee.ethz.ch/cvl/DIV2K/, 6 pages.

Sole et al., "Performance comparison of video coding standards: an adaptive streaming perspective", https://netflixtechblog.com/performance-comparison-of-video-coding-standards-an-adaptive-streaming-perspective-d45d0183ca95, 11 pages.

\* cited by examiner

MACHINE LEARNING TECHNIQUES FOR VIDEO DOWNSAMPLING

BACKGROUND

Field of the Various Embodiments

The various embodiments relate generally to computer science and to video encoding technology and, more specifically, to machine learning techniques for video downsampling.

Description of the Related Art

A typical video streaming service provides users with access to a library of media titles that can be viewed on a range of different client devices. In operation, a given client device connects to the video streaming service under a host of varying connection conditions and, therefore, can be susceptible to varying available network bandwidths. To enable a media title to be streamed to a client device without playback interruptions, irrespective of the available network bandwidth, multiple different encodings of the media title are provided to the client device, where "lower-quality" encodings usually are streamed to the client device when the available network bandwidth is relatively low, and "higher-quality" encodings usually are streamed to the client device when the available network bandwidth is relatively high.

To generate the different encodings of a given media title, a video streaming service typically encodes the media title multiple times via a video encoding pipeline. The video encoding pipeline eliminates different amounts of information from a source video associated with a given media title to generate multiple encoded videos, where each encoded video is associated with a different bitrate. In practice, a typical encoding pipeline downsamples the source video to multiple lower resolutions and then compresses the source video and each of the downsampled lower-resolution videos to different degrees to generate the different encoded videos. An encoded video associated with a given bitrate can be streamed to a client device without playback interruptions when the available network bandwidth is greater than or equal to that bitrate.

To playback a given media title on a client device, an endpoint application can be implemented on the client device that is configured to select the different encoded videos generated for the media title based on the available network bandwidth. When a given encoded video is selected by the endpoint application, one or more discrete portions or "chunks" of the selected encoded video are streamed to the client device for playback. Upon receiving a chunk of a selected encoded video, the endpoint application decodes the chunk and then optionally upsamples the resulting decoded chunk to generate a corresponding chunk of reconstructed video having the same resolution as the client device display. To affect the playback of the media title on the client device, the endpoint application plays back the different chunks of reconstructed video.

Most video encoding pipelines implement "lossy" encoding, where information is eliminated from the source video for a media title when generating the different video encodings for the media title. Thus, as a general matter, the visual quality of a given chunk of reconstructed video is usually lower than the visual quality of the chunk of source video corresponding to that chunk of reconstructed video, meaning that the chunk of reconstructed video contains relatively more visual quality impairments or artifacts. Further, as a general matter, the visual quality of a chunk of reconstructed video typically decreases as the bitrate associated with the corresponding chunk of encoded video decreases.

One drawback of conventional video encoding pipelines is that the downsamplers included in those pipelines typically implement sampling algorithms that are designed to operate robustly across many different types of digital signals and are not tailored for any particular type of digital signal. For example, downsamplers are rarely, if ever, designed to minimize the diminution in the visual quality of a reconstructed video attributable to the reduction in resolution of a corresponding source video. As a result, for a given encoding bitrate, the overall visual quality of an associated reconstructed video can be suboptimally low. Conversely, the total number of bits used to encode a source video to achieve a given target visual quality level for an associated reconstructed video can be unnecessarily high.

As the foregoing illustrates, what is needed in the art are more effective techniques for downsampling source videos in a video encoding pipeline.

SUMMARY

One embodiment sets forth a method for training a neural network to downsample images in a video encoding pipeline. The method includes executing a first convolutional neural network on a first source image having a first resolution to generate a first downsampled image, where the first convolutional neural network includes at least two residual blocks and is associated with a first downsampling factor; executing an upsampling algorithm on the first downsampled image to generate a first reconstructed image having the first resolution; computing a first reconstruction error based on the first reconstructed image and the first source image; and updating at least one parameter of the first convolutional neural network based on the first reconstruction error to generate a trained convolutional neural network.

At least one technical advantage of the disclosed techniques relative to the prior art is that the disclosed techniques can be implemented in a video encoding pipeline to mitigate visual quality reductions typically experienced with conventional video encoding pipelines. In that regard, a downsampling convolutional neural network implemented in a video encoding pipeline learns to reduce reconstruction errors when generating downsampled image representations of source images during the video encoding process. The reconstruction errors approximate decreases in visual quality of frames of reconstructed videos attributable to reductions in the resolutions of corresponding frames of source videos. Thus, the disclosed techniques enable the visual quality of a reconstructed video to be increased for a given bitrate relative to what can be achieved using prior art techniques. Conversely, the disclosed techniques enable the number of bits used when encoding a source video to achieve a given target visual quality to be reduced relative to prior art techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings

DETAILED DESCRIPTION

Figure 1:
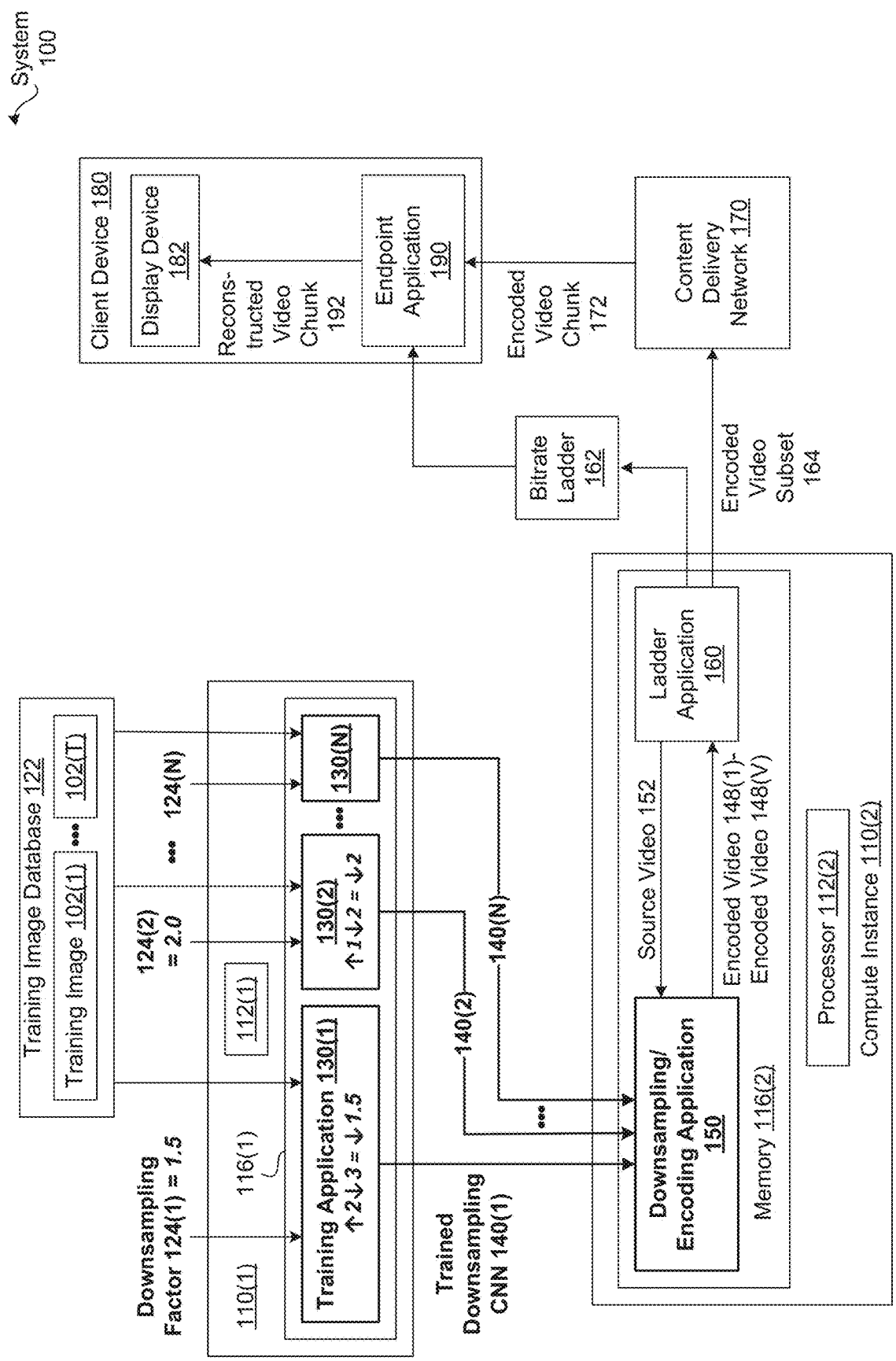
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To enable a media title to be streamed to any number of client devices without playback interruptions, a typical video streaming services pre-generates multiple different encoded videos based on a source video that is associated with the media title. The video streaming service usually pre-generates the encoded videos via a video encoding pipeline that eliminates selected information from the source video to reduce the number of bits used by the encoded videos to represent the source video. As the amount of information that is eliminated to generate an encoded video increases, the visual quality of a reconstructed video that can be derived from the encoded video to approximate the source video usually decreases. Each of the encoded videos therefore represents a different tradeoff between bitrate and the visual quality of a corresponding reconstructed video.

As a general matter, lower bitrate, lower-quality encoded videos usually are streamed to a client device when the available network bandwidth is relatively low, and higher bitrate, higher-quality encoded videos are usually streamed to a client device when the available network bandwidth is relatively high. In operation, as an encoded video is streamed to a client device, the client device generates a reconstructed video based on the encoded video and then plays back the reconstructed video to affect the playback of the media title.

To generate encoded videos having a variety of bitrates, the video encoding pipeline typically implements a downsampler and an encoder. The downsampler usually operates on source images and is therefore configured in the video encoding pipeline to perform downsampling operations on individual frames of the source video to generate corresponding frames of lower-resolution videos having multiple lower resolutions. The encoder then compresses the source video and each of the lower-resolution videos to different degrees to generate the different encoded videos.

One drawback of conventional video encoding pipelines is that the downsamplers included in those pipelines are rarely, if ever, designed to minimize the diminution in the visual quality of a reconstructed video attributable to the reduction in resolution of a corresponding source video. As a result, for a given bitrate, the overall visual quality of an associated reconstructed video can be suboptimally low. Conversely, the number of bits used to encode a source video to achieve a given target visual quality level for an associated reconstructed video can be unnecessarily high.

With the disclosed techniques, however, a training application uses machine learning techniques to generate trained downsampling convolutional neural networks ("CNNs") that reduce reconstruction errors when downsampling source images. Each reconstruction error correlates to an end-to-end loss of visual quality between a given source image and a corresponding reconstructed image. In some embodiments, each of the trained downsampling CNNs is associated with a different downsampling factor. Each of the trained downsampling CNNs maps source images to downsampled image representations having resolutions that are lower that the source image by the associated downsampling factor.

To generate the trained downsampling CNN for a given downsampling factor, the training application generates an initially untrained version of a downsampling CNN based on the downsampling factor. As persons skilled in the art will recognize, CNNs typically restrict the types of operations usually used to perform downsampling operations to operate based on integer factors. Consequently, downsampling source images based on non-integer factors via a CNN can be problematic. For example, downsampling frames of a 1920×1080 source video by a factor of 1.5 to generate corresponding frames of a 1280×720 lower-resolution video is difficult to accomplish using conventional CNN techniques.

To address the above problems, the training application generates the downsampling CNN that includes, without limitation, two residual blocks. As referred to herein, a "residual block" is a portion of a CNN that maps the input of the residual block to a residual and then adds the residual to a function of the input of the residual block to generate the output of the residual block. Each of the residual blocks can be trained to map the input of the residual block to the residual and therefore can be trained to adjust the output of the residual block.

If the downsampling factor is a non-integer, then the training application sets a resampling factor numerator and a resampling factor denominator equal to a numerator and a denominator, respectively, of a fraction that expresses the downsampling factor in lowest terms. The training application then generates the downsampling CNN that includes, without limitation, an upsampling residual block followed by a downsampling residual block. The upsampling block upsamples the source image by the resampling factor numerator to generate an upsampled image. Subsequently, the downsampling block downsamples the upsampled image to generate the downsampled image representation having a resolution that is lower than the source image by the downsampling factor. For instance, the downsampling CNN associated with the downsampling factor of 1.5 upsamples a 1920×1080 source image based on an integer factor of 2 to generate a 3840×2160 upsampled image. The downsampling CNN then downsamples the 3840×2160 upsampled image based on an integer factor of 3 to generate a 1280×720 downsampled image representation.

If, however, the downsampling factor is an integer, then the training application generates the downsampling CNN that includes, without limitation, an identity residual block that is followed by the downsampling residual block. The identity residual block is a degenerate version of the upsampling residual block that does not perform any resampling operations. The training application uses the downsampling factor as the resampling factor denominator when configuring the downsampling residual block.

The training application then trains the downsampling CNN based on a training image database to generate the trained downsampling CNN. The training image database can include, without limitation, any number and/or types of training images (e.g., frames of training videos). In operation, the training application partitions each of the training images into multiple portions referred to herein as "image patches." The training application then performs any number and/or type of training operations on the downsampling CNN based on the image patches to generate the trained downsampling CNN.

In some embodiments, the training application iteratively trains the downsampling CNN to reduce reconstruction errors associated with the image patches. To compute the reconstruction error for a given image patch, the training application inputs the image patch into the downsampling CNN. In response, the downsampling CNN outputs a downsampled image representation of the selected image patch. Subsequently, the training application upsamples the downsampled image representation by the downsampling factor to generate a reconstructed image corresponding to the image patch. The training application sets the reconstruction error for the image patch equal to the mean squared error of the reconstructed image relative to the image patch. The training application then updates the parameters of the downsampling CNN such that the residuals generated by the updated downsampling CNN mitigate the reconstruction error.

After the training application finishes training the downsampling CNN, the training application saves the downsampling CNN as the trained downsampling CNN for the associated downsampling factor. The training application can transmit the trained downsampling CNN to any number of other software applications. Notably, in some embodiments, the training application is configured to generate multiple trained downsampling CNNs corresponding to different downsampling factors for use in a video encoding pipeline instead of a conventional downsampler.

At least one technical advantage of the disclosed techniques relative to the prior art is that the disclosed techniques can be implemented in a video encoding pipeline to mitigate visual quality reductions typically experienced with conventional video encoding pipelines. In particular, a video encoding pipeline can implement trained downsampling CNNs to reduce decreases in visual quality of frames of reconstructed videos attributable to reductions in the resolutions of corresponding frames of source videos. As a result, the visual quality of a reconstructed video can increase for a given bitrate relative to what can be achieved using conventional video encoding pipelines. Conversely, relative to conventional encoding pipelines, the number of bits used by the video encoding pipeline when encoding a source video to achieve a given target visual quality can be reduced. For example, empirical results have shown that using the trained downsampling CNNs in a video encoding pipeline instead of a conventional downsampler can reduce the number of bits used when encoding a given source video to achieve a given target visual quality by nearly 25%. Another technical advantage of the disclosed techniques is that, despite limitations associated with executing downsampling operations in CNNs, any number of the trained downsampling CNNs can downsample source images and therefore source videos by non-integer downsampling factors. These technical advantages provide one or more technological improvements over prior art approaches.

System Overview

FIG. 1 is a conceptual illustration of a system 100 configured to implement one or more aspects of the various embodiments. For explanatory purposes, multiple instances or versions of like objects are denoted with reference numbers identifying the object and parenthetical alphanumeric character(s) identifying the instance or version where needed. As shown, in some embodiments, the system 100 includes, without limitation, a compute instance 110(1), a compute instance 110(2), a training image database 122, a bitrate ladder 162, a client device 180, and a content delivery network ("CDN") 170.

In some other embodiments, the system 100 can omit any number of the compute instances 110(2)-110(3), the bitrate ladder 162, the client device 180, the CDN 170, or any combination thereof. In some embodiments, the system 100 can include, without limitation, any number of instances of the compute instances 110, any number of instances of the training image database 122, any number (including none) of instances of the bitrate ladder 162, any number (including none) of instances of the client device 180, and any number of instances of the CDN 170 in any combination. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some other embodiments, each of any number of the compute instances 110 may include any number of the processors 112 and any number of the memories 116 in any combination. In particular, any number of the compute instances 110 (including one) can provide a multiprocessing environment in any technically feasible fashion.

In some embodiments, a storage (not shown) may supplement or replace the memory 116 of the compute instance 110. The storage may include any number and type of external memories that are accessible to the processor 112 of the computer instance 110. For example, and without limitation, the storage can include a Secure Digital Card, an external Flash memory, a portable compact disc read-only memory, an optical storage device, a magnetic storage device, or any suitable combination of the foregoing In general, each of the compute instances 110 is configured to implement one or more software applications. For explanatory purposes only, each software application is described as residing in the memory 116 of a single one of the compute instances 110 and executing on the processor 112 of the single one of the compute instances 110. However, in some embodiments, the functionality of each software application can be distributed across any number of other software applications that reside in the memories 116 of any number of the compute instances 110 and execute on the processors 112 of any number of the compute instances 110 in any combination. Further, the functionality of any number of software applications can be consolidated into a single software application.

In particular, in some embodiments, a downsampling/encoding application 150 and a ladder application 160 reside in the memory 116(2) of the compute instance 110(2) and execute on the processor 112(2) of the compute instance 110(2). In some embodiments, the downsampling/encoding application 150 and the ladder application 160 are collectively referred to as a "video encoding pipeline." In the same or other embodiments, the ladder application 160 configures the downsampling/encoding application 150 to generate encoded videos 148(1)-148(V), where V can be any positive integer, based on a source video 152. For explanatory purposes only, the encoded videos 148(1)-148(V) are also referred to herein individually as "the encoded video 148" and collectively as "the encoded video 148."

The source video 152 includes, without limitation, any amount and/or types of video content. Some examples of video content include, without limitation, any portion (including all) of feature length films, episodes of television programs, and music videos, to name a few. Each of the encoded videos 148 includes, without limitation, encoded video content that is derived from the video content included in the source video 152 based on a different encoding point (not shown).

In some embodiments, each of the encoding points includes, without limitation, a resolution (not shown) and a quantization parameter ("QP") value (not shown). In the same or other embodiments, the resolution for a given encoding point specifies the resolution of the source video 152 or a lower resolution. The QP value is a value for an encoding parameter that allows a monotonic performance in terms of bitrate and level of quality when encoding video content. The higher the QP value, the lower the resulting bitrate at the expense of a lower level of quality. In some other embodiments, each of the encoding points can include any number of encoding parameter sets (not shown) that each include any number and type of encoding parameters instead of or in addition to the QP value.

In some embodiments, to generate the encoded videos 148, the downsampling/encoding application 150 downsamples the source video 152 to each of the lower resolutions specified in the encoding points to generate a different lower-resolution video (not shown) for each of the resolutions. As persons skilled in the art will recognize, downsampling the source video 152 to a given resolution involves downsampling each frame (not shown in FIG. 1) of the source video 152 to the given resolution. For each of the encoding points, the downsampling/encoding application 150 encodes the source video 152 or the lower-resolution video having the resolution specified in the encoding point based on the encoding parameter set (e.g., the QP value) specified in the encoding point to generate the encoded video 148 corresponding to the encoding point. In some embodiments, the downsampling/encoding application 150 stores the encoded videos 148 in memory that is accessible to at least one other software application. In the same or other embodiments, the downsampling/encoding application 150 transmits the encoded videos 148 to at least one other software application (e.g., the bitrate ladder).

In some embodiments, the ladder application 160 generates the bitrate ladder 162 based on the encoded videos 148. The bitrate ladder 162 is designed to enable any instance of the client device 180 to achieve a target visual quality during playback of the media title based on an available network bandwidth. In some embodiments, the ladder application 160 selects an encoded video subset 164 of the encoded videos 148 that represent the best tradeoffs between visual quality and bitrate and generates the bitrate ladder 162 based on the encoded video subset 164.

In the same or other embodiments, the bitrate ladder 162 includes, without limitation, any number of different bitrate-resolution pairs (not shown), where each of the bitrate-resolution pairs corresponds to a different one of the encoded videos 148 included in the encoded video subset 164. The bitrate-resolution pair corresponding to the encoded video 148 specifies the bitrate of the encoded video 148 and the resolution of the source video or the lower-resolution video that the downsampling/encoding application 150 encoded to generate the encoded video 148.

In some embodiments, the ladder application 160 provides the encoded video subset 164 to the CDN 170 and the bitrate ladder 162 to any number of instances of the client device 180 (including the client device 180 that is depicted in FIG. 1). In some embodiments, the CDN 170 stores any number of copies of the encoded video subset 164 and any amount and/or types of other digital content in any number of servers that are located in any number of different geographic regions. In the same or other embodiments, the CDN 170 transmits digital content to any number of instances of the client device 180 in response to client requests (not shown).

The client device 180 can be any type of device that is capable of executing an endpoint application 190 and displaying an image and/or any other type of visual content via any type of display device 182. For example, the client device 180 could be, without limitation, a smart television, a game console, a desktop computer, a laptop, a smartphone, a tablet, etc. The display device 182 could be, without limitation, a liquid crystal display, a light-emitting diode display, a projection display, a plasma display panel, etc.

In some embodiments, to playback the media title associated with the source video 152 on the client device 180, the endpoint application 190 executing on the client device 180 selects one of the bitrate-resolution pairs included in the bitrate ladder 162 based on the available network bandwidth of the connection between the client device 180 and the CDN 170. The endpoint application 190 transmits a client request to the CDN 170 requesting that the CDN 170 stream at least a portion of the encoded video 148 corresponding to the bitrate-resolution pair to the client device 180. In response, the CDN 170 streams discrete portions referred to herein as "chunks" of the encoded video 148 to the client device 180 for playback.

For explanatory purposes only, FIG. 1 depicts an encoded video chunk 172 that is a chunk of one of the encoded videos 148 that is selected and streamed to the client device 180 at a particular point in time. Because the client device 180 typically receives a sequence of chunks of the encoded videos 148 over time, the particular chunk of the encoded videos 148 represented by the encoded video chunk 172 changes over time. For explanatory purpose only, different chunks of the encoded videos 148 are different instances of the encoded video chunk 172. Different instances of the encoded video chunk 172 are also referred to herein individually as "the encoded chunk 172" and collectively as the "encoded video chunks 172."

In some embodiments, upon receiving the encoded video chunk 172, the endpoint application 190 decodes the encoded video chunk 172 to generate a decoded video chunk (not shown). The endpoint application 190 performs any number (including none) and/or types of sampling operations (e.g., upsampling operations or downsampling operations) on the decoded video chunk to generate a reconstructed video chunk 192 having the same resolution as the display device 182. To affect the playback of the media title on the client device 180, the endpoint application 190 plays back a sequence of different instances of the reconstructed video chunk 192 corresponding to different chunks of the source video 152. For explanatory purpose only, different chunks of a reconstructed video (not shown) are different instances of the reconstructed video chunk 192. Different instances of the reconstructed video chunk 192 are also referred to herein individually as "the reconstructed video chunk 192" and collectively as "the reconstructed video chunks 192."

As described previously herein, conventional video encoding pipelines typically include conventional downsamplers that execute conventional sampling algorithms to downsample source videos to lower-resolution videos. Conventional sampling algorithms are rarely, if ever, designed to minimize the diminution in the visual quality of a reconstructed video attributable to the reduction in resolution of a corresponding source video. As a result, for a given encoding bitrate, when an encoded video is generated via a conventional video encoding pipeline, the overall visual quality of an associated reconstructed video derived from the encoded video can be suboptimally low. Furthermore, the total number of bits used to encode a source video via a conventional video encoding pipeline to achieve a given target visual quality level for an associated reconstructed video can be unnecessarily high.

Using Machine Learning Techniques to Downsample Source Videos

To address the above problems, the system 100 includes, without limitation, training applications 130(1)-130(N), where N can be any positive integer. The training applications 130(1)-130(N) use machine learning techniques to generate trained downsampling convolutional neural networks ("CNNs") 140(1)-140(N), respectively, that reduce reconstruction errors (not shown in FIG. 1) when downsampling source images (not shown in FIG. 1). Each source image can be any portion (including all) of any type of image (e.g., a frame of the source video 152).

In some embodiments, a reconstruction error is a value for any type of metric that correlates to an end-to-end loss of visual quality between a given source image and a reconstructed version of the source image. For instance, in some embodiments, the training applications 130(1)-130(N) optimize the trained downsampling CNNs 140(1)-140(N) to reduce the mean squared errors of reconstructed images relative to the source images when upsampling the source images.

The training application 130(1)-130(N) are different instances of a training application 130 (not explicitly shown). For explanatory purposes only, the training applications 130(1)-130(N) are also referred to herein individually as "the training application 130" and collectively as "the training applications 130." As shown, in some embodiments, the training applications 130 reside in the memory 116(1) of the compute instance 110(1) and execute on the processor 112(1) of the compute instance 110(1). In some other embodiments, each of the training applications 130 can reside in any of the memories 116 of any number of the compute instances 110 and execute in any of the processors 112 of any number of the compute instances 110 in any combination.

In some embodiments, the training applications 130(1)-130(N) generate the trained downsampling CNNs 140(1)-140(N), respectively, based on the downsampling factors 124(1)-124(N), respectively, and the training image database 122. For explanatory purposes only, the trained downsampling CNNs 140(1)-140(N) are also referred to herein individually as "the trained downsampling CNN 140" and collectively as "the trained downsampling CNNs 140." The downsampling factors 124(1)-124(N) are also referred to herein individually as "the downsampling factor 124" and collectively as "the downsampling factors 124."

Each of the downsampling factors 124 can be any integer or any non-integer. The downsampling factor $124(x)$, where x is an integer from 1 to N, configures the training application $130(x)$ to generate the trained downsampling CNN $140(x)$ that downsamples a given source image by the downsampling factor $124(x)$ to generate a downsampled image representation (not shown in FIG. 1) of the source image. The trained downsampling CNN $140(x)$ is also referred to herein as "the trained downsampling CNN 140 for the downsampling factor $124(x)$." The downsampled image representation is a downsampled image that represents a source image.

As described in greater detail below in conjunction with FIG. 2, in some embodiments, to generate the trained downsampling CNN 140 for a given one of the downsampling factors 124, the training application 130 generates an initially untrained downsampling CNN (not shown in FIG. 1) based on the downsampling factor 124. Subsequently, the training application 130 trains the downsampling CNN based on the training image database 122 to generate the trained downsampling CNN 140 for the downsampling factor 124.

In some embodiments, if the downsampling factor 124 is a non-integer, then the training application 130 generates the downsampling CNN that upsamples the source image to generate an upsampled image (not shown in FIG. 1) and then downsamples the upsampled image to generate the downsampled image representation. More precisely, the downsampling CNN upsamples the source image by an upsampling factor that is equal to a resampling factor numerator (not shown in FIG. 1) and downsamples the upsampled image by a factor that is equal to a resampling factor denominator (not shown in FIG. 1). The resampling factor numerator and the resampling factor denominator are equal to a numerator and a denominator, respectively, of a fraction that expresses the downsampling factor 124 in lowest terms. The downsampling CNN therefore maps the source image to the downsampled image representation having a downsampled image resolution that is lower than the resolution of the source image by the downsampling factor 124.

If, however, the downsampling factor 124 is an integer, then the training application 130 generates the downsampling CNN that maps the source image to a mitigated source image (not shown in FIG. 1) and then maps the mitigated source image to the downsampled image representation. The mitigated source image has the same resolution as the source image, and the downsampled image representation has a resolution that is lower than the resolution of the source image by the downsampling factor 124.

In some embodiments, the training application 130 trains the downsampling CNN based on the training image database 122 to generate the trained downsampling CNN 140. As shown, in some embodiments, the training image database 122 includes, without limitation, training images 102(1)-102(T), where T can be any positive integer. The training images 102(1)-102(T), are also referred to herein individually as "the training image 102" and collectively as "the training images 102."

Each of the training images 102 can be any type of image and can be associated with a different resolution. In some embodiments, any number of the training images 102 are frames of videos (e.g., the source video 152). In the same or other embodiments, any number of the training images 102 are selected to represent one or more image and/or videos characteristics (e.g., resolutions, genres, etc.) for which the trained downsampling CNNs 140 are to be tuned.

As described in greater detail below in conjunction with FIG. 2, in some embodiments, the training application 130 iteratively trains the downsampling CNN to reduce reconstruction errors when downsampling discrete portions known as "image patches" of the training images 102. To compute the reconstruction error for a given image patch, the training application 130 inputs the image patch into the downsampling CNN. In response, the downsampling CNN generates the downsampled image representation of the image patch. The training application 130 configures a differentiable upsampling algorithm (not shown) to upsample the downsampled image representation by the downsampling factor 124 to generate the reconstructed image. The training application 130 then computes the reconstruction error based on the image patch and the reconstructed image in any technically feasible fashion. For instance, in some embodiments, the training application 130 sets the reconstruction error equal to the mean squared error of the reconstructed image relative to the image patch.

After the training application 130 finishes training the downsampling CNN, the training application 130 saves the downsampling CNN as the trained downsampling CNN 140 for the downsampling factor 124. For explanatory purposes only, FIG. 1 depicts some exemplary values associated with the trained downsampling CNN 140(1) and the trained downsampling CNN 140(2) in italics. As depicted, in some embodiments, the downsampling factor 124(1) is 1.5. The training application 130(1) therefore generates the trained downsampling CNN 140(1) that upsamples the source image by a factor of 2 (denoted as T2) to generate the upsampled image and then downsamples the upsampled image by a factor of 3 (denoted as L3) to generate the downsampled image representation. In the same or other embodiments, the downsampling factor 124(2) is 2. The training application 130(1) therefore generates the trained downsampling CNN 140(1) that maps the source image to the mitigated source image (denoted as T1) and then downsamples the mitigated source image by a factor of 2 (denoted as L2) to generate the downsampled image representation.

In some embodiments, the training application 130 stores the trained downsampling CNN 140 in any memory that is accessible to at least one other software applications. In the same or other embodiments, the training application 130 transmits the trained downsampling CNN 140 to any number and/or types of other software applications. For instance, in some embodiments, the training applications 130(1)-130(N) transmit the trained downsampling CNNs 140(1)-140(N), respectively, to the downsampling/encoding application 150.

In some embodiments, to use the trained downsampling CNNs 140 to generate the encoded videos 148, the downsampling/encoding application 150 determines a subset (not shown) of the downsampling factors 124 based on the resolution of the source video 152 and the resolutions specified in the encoding points. For each of the downsampling factors 124 included in the subset of the downsampled factors 124, the downsampling/encoding application 150 executes the trained downsampling CNN 140 for the downsampled factor 124 on the source video 152 to generate a lower-resolution video corresponding to the downsampling factor 124. For each of the encoding points, the downsampling/encoding application 150 encodes the source video 152 or the lower-resolution video having the resolution specified in the encoding point based on the encoding parameter set (e.g., the QP value) specified in the encoding point to generate the encoded video 148 corresponding to the encoding point. In some embodiments, the ladder application 160 generates the bitrate ladder 162 based on the encoded videos 148.

In the same or other embodiments, as described previously herein, the endpoint application executes on the client device 180. To playback at least a portion of the media title associated with the source video 152 on the client device 180, the endpoint application 190 selects one of the encoded videos 148 derived from the source video 152. The endpoint application 190 can select the encoded video 148 in any technically feasible fashion. For instance, in some embodiments, the endpoint application 190 selects the encoded video 148 based on the bitrate-resolution pairs included in the bitrate ladder 162 and the available network bandwidth associated with the client device 180. When one of the encoded videos 148 is selected by the endpoint application 190, any number of the encoded video chunks 172 of the encoded videos 148 are streamed to the client device 180 for playback.

As described previously herein, upon receiving each of the encoded video chunks 172, the endpoint application 190 decodes the encoded video chunk 172 to generate a decoded video chunk (not shown). The endpoint application 190 performs any number (including none) and/or types of sampling operations (e.g., upsampling operations or downsampling operations) on the decoded video chunk to generate the reconstructed video chunk 192 having the same resolution as the display device 182. For instance, in some embodiments, the endpoint application 190 upsamples the decoded video chunk. In some other embodiments, the endpoint application 190 uses one of the trained downsampling CNNs 140(1)-140(N) to downsample the decoded video chunk. To affect the playback of the media title on the client device 180, the endpoint application 190 sequentially plays back the reconstructed video chunks 192.

Notably, the reconstruction errors used to optimize the trained downsampling CNNs 140 approximate decreases in visual quality of frames of the reconstructed video chunk 192 attributable to reductions in the resolutions of corresponding frames of the source video 152. Consequently, generating the encoded videos 148 using the trained downsampling CNNs 140 instead of a conventional downsampler in a video encoding pipeline can mitigate visual quality reductions typically experienced with conventional video encoding pipelines.

In some embodiments, because the downsampling/encoding application 150 uses the trained downsampling CNNs 140 instead of a conventional downsampler to generate the lower-resolution videos, the visual quality of the reconstructed video chunk 192 for a given bitrate can be increased. Conversely, the number of bits that the downsampling/encoding application 150 uses to encode the source video 152 to achieve a target visual quality can be reduced.

Note that the techniques described herein are illustrative rather than restrictive and may be altered without departing from the broader spirit and scope of the invention. Many modifications and variations on the functionality provided by the training application 130 and the trained downsampling CNNs 140 will be apparent to those of ordinary skill in the art without departing from the scope and spirit of the described embodiments.

It will be appreciated that the system 100 shown herein is illustrative and that variations and modifications are possible. For instance, the connection topology between the various components in FIG. 1 may be modified as desired. For instance, in some embodiments, the training application 130 is integrated into the video encoding pipeline. In the same or other embodiments, the ladder application 160 is omitted from the video encoding pipeline.

Generating a Trained Downsampling CNN

Figure 2:
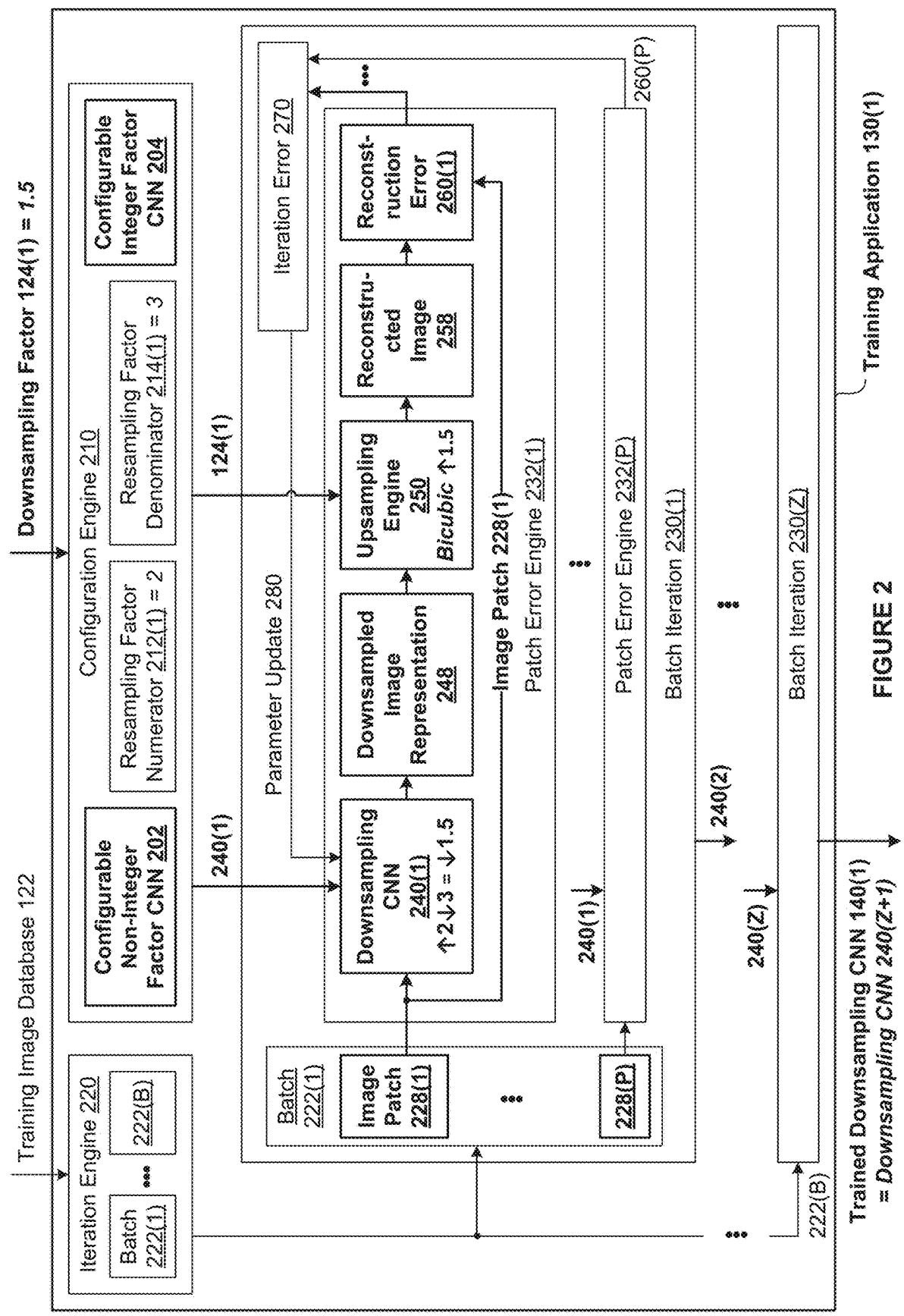
FIG. 2 is a more detailed illustration of one of the training applications of FIG. 1, according to various embodiments.

FIG. 2 is a more detailed illustration of one of the training applications 130 of FIG. 1, according to various embodiments. More specifically, FIG. 2 depicts the training application 130(1) that generates the trained downsampling CNN 140(1) based on the downsampling factor 124(1) and the training image database 122. The downsampling factor 124(1) can be any integer or any non-integer. As described previously herein in conjunction with FIG. 1, the training image database 122 includes, without limitation, the training images 102(1)-102(T), where T can be any positive integer. In some embodiments, any number of the training images 102 are frames of any number and/or types of training videos (not shown).

As shown, in some embodiments, the training application 130(1) includes, without limitation, a configuration engine 210, reconstruction error engines 232(1)-232(P), and an iteration engine 220, where P can be any positive integer. Each of the reconstruction error engines 232(1)-232(P) is a different instance of the same version of a reconstruction error engine 232 (not explicitly shown). For explanatory purposes only, instances of the reconstruction error engines 232 irrespective of the versions are also referred to herein individually as "the reconstruction error engine 232" and collectively as "the reconstruction error engines 232."

In some embodiments, the configuration engine 210 generates a downsampling CNN 240(1) based on the downsampling factor 124(1). The downsampling CNN 240(1) is initial version of a downsampling CNN 240 (not explicitly depicted). The downsampling CNN 240(1) maps a source image (not shown in FIG. 2) to a downsampled image representation 248 of the source image having a resolution that is lower than the source image by the downsampling factor 124(1). The source image can be any portion (including all) of any type of image. The configuration engine 210 can generate the downsampling CNN 240(1) in any technically feasible fashion.

As shown, in some embodiments, the configuration engine 210 includes, without limitation, a configurable non-integer factor CNN 202, a configurable integer factor CNN 204, a resampling factor numerator 212(1), and a resampling factor denominator 214(1). As persons skilled in the art will recognize, CNNs typically only allow pooling operations and stride operations based on integer factors and therefore performing resizing (e.g., downsampling or upsampling) of source images based on non-integer factors via a CNN can be problematic. Advantageously, the configurable non-integer factor CNN 202 can be configured to perform resizing of source images based on any non-integer factor via two configurable factors that can be set equal to any integers.

More specifically, the configurable non-integer factor CNN 202 maps a given source image to an upsampled image (not shown in FIG. 2) and then maps the upsampled image to the downsampled image representation 248. The upsampled image has a resolution that is higher than the source image by a first configurable factor, and the downsampled image representation 248 has a resolution that is lower than the upsampled image by a second configurable factor.

The configurable integer factor CNN 204 is a degenerate version of the configurable non-integer factor CNN 202 that is pre-configured and simplified based on a value of one for the first configurable factor. As a result, the configurable integer factor CNN 204 has a single configurable factor. The configurable integer factor CNN 204 maps the source image to a mitigated source image (not shown in FIG. 2) and then maps the mitigated source image to the downsampled image representation 248. The mitigated source image has the same resolution as the source image, and the downsampled image representation 248 has a resolution that is lower than the source image by the single configurable factor.

In some embodiments, if the downsampling factor 124(1) is a non-integer, then the configuration engine 210 sets the resampling factor numerator 212(1) and the resampling factor denominator 214(1) equal to a numerator and a denominator, respectively, of a fraction that expresses the downsampling factor 124(1) in lowest terms. Subsequently, to generate the downsampling CNN 240(1), the configuration engine 210 sets the first configurable factor and the second configurable factor of the configurable non-integer factor CNN 202 equal to the resampling factor numerator 212(1) and the resampling factor denominator 214(1), respectively. By contrast, if the downsampling factor 124(1) is an integer, then the configuration engine 210 sets the single configurable factor of the configurable integer factor CNN 204 equal to the downsampling factor 124(1) to generate the downsampling CNN 240(1).

In some embodiments, the configurable non-integer factor CNN 202 includes, without limitation, one set of parameters (e.g., weights and biases) that can be trained to modify the mapping from the source image to the upsampled image and another set of parameters that can be trained to modify the mapping from the upsampled image to the downsampled image representation 248. Similarly, the configurable integer factor CNN 204 includes, without limitation, one set of parameters that can be trained to modify the mapping from the source image to the mitigated source image and another set of parameters that can be trained to modify the mapping from the mitigated source image to the downsampled image representation 248. Consequently, the downsampling CNN 240(1) includes, without limitation, two sets of trainable parameters that both impact the downsampled image representation 248 irrespective of whether or not the downsampling factor 124(1) is an integer.

For explanatory purposes only, the "downsampling CNN 240" refers herein to any CNN that the training application 130 trains to downsample images by one of the downsampling factors 124. The result of the training is the trained CNN that is also referred to herein as the "trained downsampling CNN 140." The training application 130(1) can train the downsampling CNN 240 in any technically feasible fashion.

In some embodiments, to enable the iteration engine 220 to effectively train the downsampling CNN 240, the configuration engine 210 configures an initial version of the reconstruction error engine 232 to compute a reconstruction error 260 (not explicitly shown) based on an image patch (not explicitly shown) and the downsampling CNN 240(1). The image patch 228 can be any portion (including all) of any type of image. For explanatory purposes only, instances of the image patch 228 are also referred to herein individually as "the image patch 228" and collectively as "the image patches 228." Each of the image patches 228 is a different source image.

As described in greater detail below, the reconstruction error 260 correlates to a decrease in the visual quality of a reconstructed image 258 derived from one of the image patches 228 that is attributable to the downsampling CNN 240. In particular, in the initial version of the reconstruction error engine 232, the reconstruction error 260 correlates to a decrease in the visual quality of the reconstructed image 258 derived from one of the image patches 228 that is attributable to the initial version of the downsampling CNN 240.

As shown for the reconstruction error engine 232(1), the initial version of the reconstruction error engine 232 includes, without limitation, the downsampling CNN 240(1) and an upsampling engine 250. The upsampling engine 250 can implement any differentiable upsampling algorithm in any technically feasible fashion. Some examples of differentiable upsampling algorithms includes, without limitation, bicubic upsampling algorithms and bilinear upsampling algorithms. The configuration engine 210 configures the upsampling engine 250 to upsample by the downsampling factor 124(1). The configuration engine 210 can configure the upsampling engine 250 in any technically feasible fashion. For instance, in some embodiments, the configuration engine 210 configures the upsampling engine 250 via a configurable setting (not shown) that is associated with the upsampling algorithm implemented by the upsampling engine 250.

For explanatory purposes only, some exemplary values associated with the configuration engine 210 in some embodiments are depicted in italics. As depicted in italics, in some embodiments, the downsampling factor 124(1) is equal to 1.5. Based on the non-integer value of 1.5 for the downsampling factor 124(1), the configuration engine 210 sets the resampling factor numerator 212(1) equal to 2 and the resampling factor denominator 214(1) equal to 3. As depicted in italics, the configuration engine 210 configures the configurable non-integer factor CNN 202 based on the resampling factor numerator 212(1) of 2 and the resampling factor denominator 214(1) of 3 to generate the downsampling CNN 240(1). The configuration engine 210 also configures a bicubic algorithm in the upsampling engine 250 to upsample by the downsampling factor 124(1) of 1.5 (depicted in italics).

Upon receiving one of the image patches 228 as an input, the reconstruction error engine 232 inputs the image patch 228 into the downsampling CNN 240(1). In response, the downsampling CNN 240(1) outputs the downsampled image representation 248 of the image patch 228. The reconstruction error engine 232 inputs the downsampled image representation 248 into the upsampling engine 250. In response, the upsampling engine 250 generates the reconstructed image 258 that approximates the image patch 228. The reconstruction error engine 232 computes and outputs the reconstruction error 260 for the image patch 228 based on the image patch 228 and the reconstructed image 258.

The reconstruction error engine 232 can compute the reconstruction error 260 in any technically feasible fashion. In some embodiments, the reconstruction error engine 232 computes the reconstruction error 260 based on any number and/or types of visual quality metrics and/or any number and/or types of visual quality models. For instance, in some embodiments, the reconstruction error engine 232 sets the reconstruction error 260 equal to the mean squared error of the reconstructed image 258 relative to the image patch 228. In some other embodiments, the reconstruction error engine 232 sets the reconstruction error 260 equal to the peak signal-to-noise ratio between the reconstructed image 258 and the image patch 228.

In some embodiments, the iteration engine 220 uses the reconstruction error engine 232 to perform any number and/or types of training operations on the downsampling CNN 240(1) based on the training image database 122. As used herein, a "training operations" refer to any number and/or types of operations that are used to determine new values for the parameters (e.g., weights and biases) of a CNN (e.g., the downsampling CNN 240(1)) and any number and/or types of operations that are used to update the parameters of the CNN to the new values.

More specifically, in some embodiments, the iteration engine 220 uses instances of the reconstruction error 260 computed by the reconstruction error engine 232 based any number of the image patches 228 derived from the training images 102 to iteratively modify the parameters included in the downsampling CNN 240(1). For explanatory purposes only, instances of the reconstruction error 260 are also referred to herein individually as "the reconstruction error 260" and collectively as "the reconstruction error 260."

In some embodiments, the iteration engine 220 generates at least one instance of the image patch 228 for each of the training images 102 included in the training image database 122. The iteration engine 220 can generate the image patches 228 for each of the training images 102 in any technically feasible fashion. In some embodiments, the subset of image patches 228 associated with each of the training images 102 do not overlap.

In the same or other embodiments, the iteration engine 220 distributes the image patches 228 derived from the training images 102 across batches 222(1)-222(B), where B can be any positive integer. For explanatory purposes only, the batches 222(1)-222(B) are also referred to herein individually as "the batch 222" and collectively as "the batches 222." The iteration engine 220 can determine how many of the batches 222 to generate and can partition the image patches 228 across the batches 222 in any technically feasible fashion.

For instance, in some embodiments, the iteration engine 220 generates a total number of the batches 222 that is greater than one but less than the total number of the image patches 228 and then distributes the image patches 228 approximately evenly across the batches 222. In some other embodiments, the iteration engine 220 generates a single instance of the batch 222 and then assigns all of the image patches 228 to the batch 222. In yet other embodiments, the iteration engine 220 generates a total number of the batches 222 that is equal to the total number of the image patches 228 and then assigns a different one of the image patches 228 to each of the batches 222.

As shown, in some embodiments, the iteration engine 220 iteratively trains the downsampling CNN 240(1) via batch iterations 230(1)-230(Z), where Z is equal to the product of a total number of epochs (not shown) and the total number of the batches 222. For explanatory purposes only, the batch iterations 230(1)-230(Z), are also referred to herein individually as "the batch iteration 230" and collectively as "batch iterations 230." The iteration engine 220 can determine the total number of epochs in any technically feasible fashion. For instance, in some embodiments, the iteration engine 220 determines the total number of epochs, at least in part, based on input received via a graphical user interface (not shown). In the same or other embodiments, the iteration engine 220 determines the total number of epochs based on any number and/or types of convergence criteria.

In some embodiments, the iteration engine 220 sequentially executes the epochs. To execute each epoch, the iteration engine 220 sequentially executes one of the batch iterations 230 for each of the batches 222. Accordingly, the iteration engine 220 sequentially executes the batch iterations 230(1)-230(Z). In the same or other embodiments, during each of the batch iterations 230, the iteration engine 220 inputs the image patches 228 included in the batch 222 into any number of the reconstruction error engines 232 sequentially, concurrently, or in any combination thereof. In response, the reconstruction error engines 232 compute and output the reconstruction errors 260 for each of the image patches 228 included in the batch 222 sequentially, concurrently, or in any combination thereof.

In the same or other embodiments, the iteration engine 220 computes an iteration error 270 for the batch iteration 230 based on the reconstruction errors 260 computed by the reconstruction error engine 232 during the batch iteration 230. The iteration error 270 can be any value for any type of overall objective function (e.g., an overall loss function), and the iteration engine 220 can compute the iteration error 270 in any technically feasible fashion. For instance, in some embodiments, the iteration engine 220 sets the iteration error 270 equal to the average of the reconstruction errors 260 computed by the reconstruction error engine 232 during the batch iteration 230.

In some embodiments, to complete the batch iteration 230, the iteration engine 220 performs a parameter update 280 based on a goal of reducing the iteration error 270. During the parameter update 280, the iteration engine 220 updates any number of the parameters of the downsampling CNN 240 to generate a new version of the downsampling CNN 240 that is better optimized for the goal of reducing the iteration error 270. The iteration engine 220 can execute any number and/or types of machine learning operations to perform the parameter update 280. For instance, in some embodiments, the iteration engine 220 executes any number and/or types of backpropagation operations and any number and/or types of gradient descent operations to update the parameters of the current version of the downsampling CNN 240, thereby generating a new version of the downsampling CNN 240.

For explanatory purpose only, FIG. 2 depicts an example of the batch iteration 230(1) for some embodiments in detail. As shown, in some embodiments, the batch 222(1) includes, without limitation, the image patches 228(1)-228(P), where P can be any integer. The iteration engine 220 inputs the image patches 228(1)-228(P) into the reconstruction error engines 232(1)-232(P) concurrently. Notably, each of the reconstruction error engines 232(1)-232(P) includes the downsampling CNN 240(1). In response, the reconstruction error engines 232(1)-232(P) concurrently compute and output the reconstruction errors 260(1)-260(P). The iteration engine 220 computes the iteration error 270 based on the reconstruction errors 260(1)-260(P). Subsequently, the iteration engine 220 performs the parameter update 280 on the downsampling CNN 240(1) based on the iteration error 270 to generate a new version of the downsampling CNN 240 that is denoted in FIG. 2 as "the downsampling CNN 240(2)."

In some embodiments, after completing each of the batch iterations 230, the iteration engine 220 configures the reconstruction error engine 232 to use the newly generated version of the downsampling CNN 240 during the next one of the batch iterations 230. For explanatory purposes only, the different versions of the downsampling CNN 240 are denoted herein as the downsampling CNNs 240(1)-240(Z+1), where Z is the total number of the batch iterations 230. Accordingly, during the batch iteration 230(x), where x is an integer between 1 and Z, the iteration engine 220 computes the iteration error 270 based on the downsampling CNN 240(x) and generates the downsampling CNN 240(x+1).

As shown, after executing the batch iteration 230(Z), the iteration engine 220 sets the trained downsampling CNN 140(1) equal to the downsampling CNN 240(Z+1). In some embodiments, the iteration engine 220 stores the trained downsampling CNN 140(1) in a memory that is accessible to any number of other software applications. In the same or other embodiments, the iteration engine 220 transmits the trained downsampling CNN 140(1) to any number of other software applications. For instance, in some embodiments, the iteration engine 220 transmits the trained downsampling CNN 140(1) to the downsampling/encoding application 150.

Trained Downsampling CNNs

Figure 3:
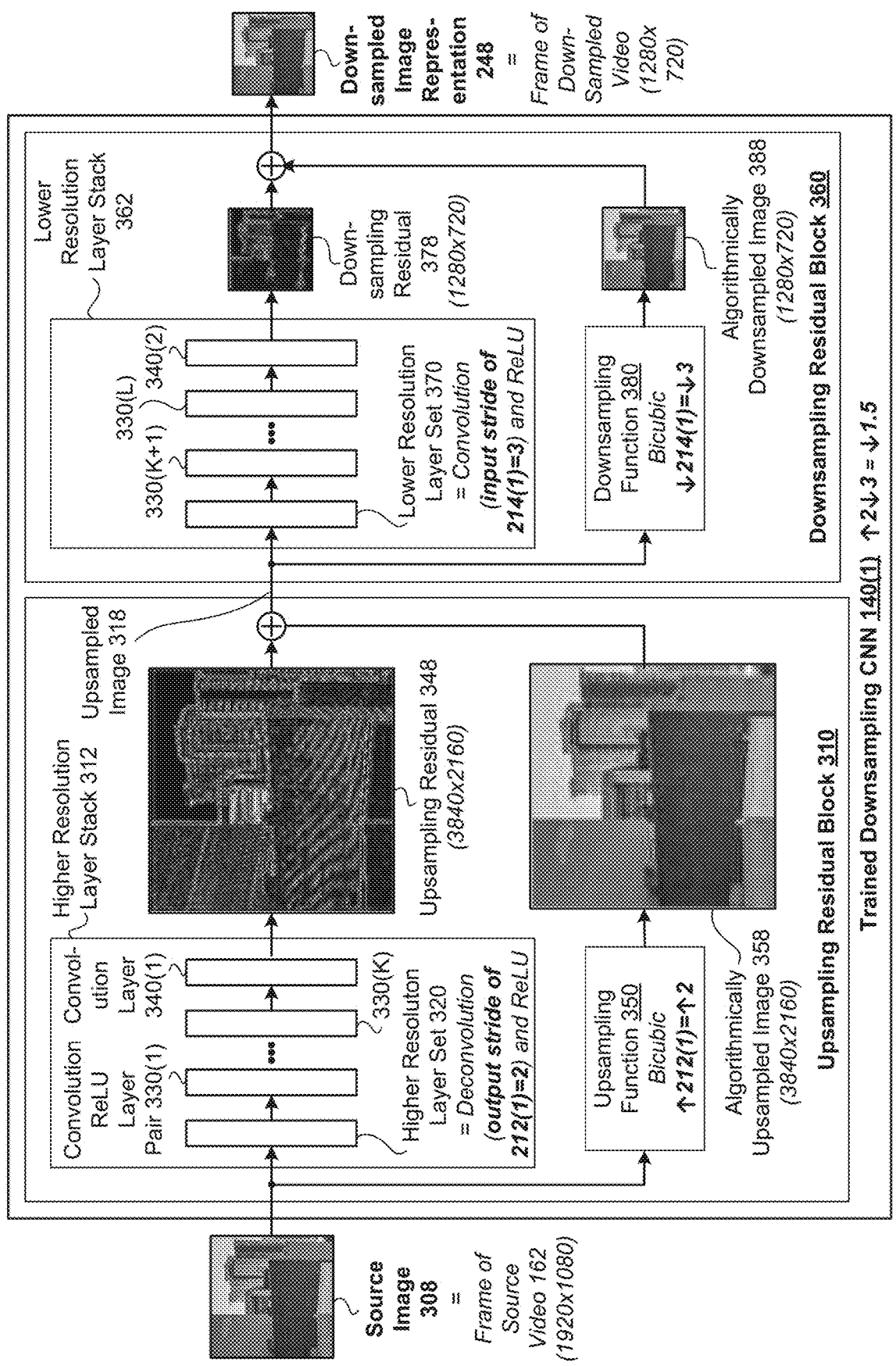
FIG. 3 is a more detailed illustration of one of the trained downsampling convolution neural networks of FIG. 1 that downsamples by a non-integer factor, according to various embodiments.

FIG. 3 is a more detailed illustration of the one of the trained downsampling CNNs 140 of FIG. 1 that downsamples by a non-integer factor, according to various embodiments. More specifically, FIG. 3 depicts the trained downsampling CNN 140(1) of FIG. 1 that is associated with the downscaling factor 124(1) that can be any non-integer. As described previously herein in conjunction with FIG. 2, the trained downsampling CNN 140(1) is also associated with the resampling factor numerator 212(1) and the resampling factor denominator 214(1). The resampling factor numerator 212(1) and the resampling factor denominator 214(1) are the numerator and denominator, respectively, of a fraction (not shown) that is equal to the reciprocal of the downsampling factor 124(1).

As shown, in some embodiments, the trained downsampling CNN 140(1) maps a source image 308 to the downsampled image representation 248 having a resolution that is lower than the resolution of the source image 308 by the downsampling factor 124(1). The source image 308 can be any portion (including all) of any image having any resolution. In some embodiments, the source image 308 is at least a portion of a frame of the source video 152.

Although not shown, in the same or other embodiments, the downsampling/encoding application 150 inputs each frame included in the source video 152 into any number of instances of the downsampling CNN 240(1) concurrently, sequentially, or any combination thereof. In response, the instance(s) of the trained downsampling CNN 140(1) output each frame included in a lower-resolution video having a resolution that is lower than the resolution of the source video 152 by the downsampling factor 124(1). The lower-resolution video is also referred to herein as a "down-sampled video."

In some embodiments, the trained downsampling CNN 140(1) includes, without limitation, an upsampling residual block 310 and a downsampling residual block 360. As referred to herein, a "residual block" is a portion of a CNN that maps the input of the residual block to a residual and then adds the residual to a function of the input of the residual block to generate the output of the residual block. For explanatory purposes only, each residual block includes, without limitation, a "primary" path that maps the input of the residual block to the residual and a "shortcut" path that computes the function of the input of the residual block.

In some embodiments, as the training application 130(1) performs training operations on the downsampling CNN 240(1) to generate the trained downsampling CNN 140(1), both the upsampling residual block 310 and the downsampling residual block 360 learn residual mappings that jointly reduce the reconstruction error 260. Consequently, the learned parameters of the upsampling residual block 310 and the learned parameters of the downsampling residual block 360 mitigate a reduction in visual quality associated with a loss of data that is in inherent in the downsampling function 380.

As shown, in some embodiments, the input to the upsampling residual block 310 is the source image 308 and the output of the upsampling residual block 310 is an upsampled image 318. The resolution of the upsampled image 318 is equal to the product of the resolution of the source image 308 and the resampling factor numerator 212(1). For explanatory purposes only, the product of the resolution of the source image 308 and the resampling factor numerator 212(1) is also referred to herein as an "upsampled resolution."

In some embodiments, the upsampling residual block 310 includes, without limitation, an upsampling function 350 and a higher resolution layer stack 312. As shown, in some embodiments, a first split connection (not labelled) routes the source image 308 to the input of the upsampling function 350 and the input of the higher resolution layer stack 312. The output of the upsampling function 350 is an algorithmically upsampled image 358 having the upsampled resolution. The output of the higher resolution layer stack 312 is an upsampling residual 348 having the upsampled resolution. As denoted via a circled plus, in some embodiments, a first join connection performs a sample-wise summation between the upsampling residual 348 and the algorithmically upsampled image 358 to generate the upsampled image 318.

In some embodiments, the upsampling function 350 can implement any differentiable upsampling algorithm in any technically feasible fashion to generate the algorithmically upsampled image 358 based on the source image 308. Some examples of differentiable upsampling algorithms include, without limitation, bicubic upsampling algorithms and bilinear upsampling algorithms. In the same or other embodiments, the upsampling function 350 and the upsampling engine 250 included in the training application 130(1) implement the same upsampling algorithm. In some embodiments, the upsampling function 350 does not include any trainable parameters. Accordingly, the upsampling function 350 included in the downsampling CNN 240(1) has the same functionality as the upsampling function 350 included in the trained downsampling CNN 140(1).

The higher resolution layer stack 312 includes, without limitation, any number and/or types of layers that are trained to map the source image 308 to the upsampling residual 348. As shown, in some embodiments, the higher resolution layer stack 312 includes, without limitation, a higher resolution layer set 320, convolution Rectified Linear Unit ("ReLU") layer pairs 330(1)-330(K), and a convolution layer 340(1), where K can be any positive integer.

The higher resolution layer set 320 includes, without limitation, any number and/or types of layers that perform any number and/or types of upsampling operations in any technically feasible fashion and optionally any number and/or types of other layers. For instance, in some embodiments, the upsampling layer set includes, without limitation, an upsampling layer (not shown) that is optionally followed by an activation layer (not shown). The input of the upsampling layer is the source image 308 and the output of the upsampling layer has the upsampled resolution.

In some embodiments, the upsampling layer is a deconvolution layer with an output stride that is equal to the resampling factor numerator 212(1). In operation, the deconvolution layer executes a strided deconvolution operation on the source image 308 that upsamples the source image 308 by a factor that is equal to the resampling factor numerator 212(1). In some other embodiments, the upsampling layer is an unpooling layer. The unpooling layer can execute any type of unpooling operation (e.g., a nearest neighbor unpooling operation, a max unpooling operation, etc.) on the source image 308. In the same or other embodiments, the output of the upsampling layer is the input of an activation layer and the output of the activation layer is the output of the higher resolution layer set 320. For instance, in some embodiments, the activation layer is a ReLU layer that applies a rectified linear activation function to each sample included in the output of the upsampling layer to generate the output of the higher resolution layer set 320.

The convolution ReLU layer pairs 330(1)-330(K) are instances of a convolution ReLU layer pair 330 (not explicitly shown). For explanatory purposes only, instances of the convolution ReLU layer pair 330 (including the convolution ReLU layer pairs 330(1)-330(K)) are also referred to herein individually as "the convolution ReLU layer pair 330" and collectively as "the convolution ReLU layer pairs 330." The convolution ReLU layer pair 330 includes, without limitation, a convolution layer followed by a ReLU layer. The input to the convolution ReLU layer pair 330(1) is the output of the higher resolution layer set 320. The input to the convolution ReLU layer pair 330($x$), where x is an integer from 2 to K, is the output of the convolution ReLU layer pair 330($x$−1). As shown, in some embodiments, the output of the convolution ReLU layer pair 330(K) is the input to the convolution layer 340(1), and the output of the convolution layer 340(1) is the upsampling residual 348.

As shown, in some embodiments, the input to the downsampling residual block 360 is the upsampled image 318 and the output of the downsampling residual block 360 is the downsampled image representation 248. The resolution of the downsampled image representation 248 is equal to the resolution of the upsampled image 318 divided by the resampling factor denominator 214(1). The resolution of the downsampled image representation 248 is therefore also equal to the resolution of the source image 308 divided by the downsampling factor 124(1). For explanatory purposes only, the resolution of the downsampled image representation 248 is also referred to herein as a "downsampled resolution."

In some embodiments, the downsampling residual block 360 includes without limitation, a downsampling function 380 and a lower resolution layer stack 362. In the same or other embodiments, a second split connection (not labelled) routes the upsampled image 318 to the input of the downsampling function 380 and the input of the lower resolution layer stack 362. The output of the downsampling function 380 is an algorithmically downsampled image 388 having the downsampled resolution. The output of the lower resolution layer stack 362 is a downsampling residual 378 having the downsampled resolution. As denoted via a circled plus, in some embodiments, a second join connection performs a sample-wise summation between the downsampling residual 378 and the algorithmically downsampled image 388 to generate the downsampled image representation 248.

In some embodiments, the downsampling function 380 can implement any differentiable downsampling algorithm in any technically feasible fashion to generate the algorithmically downsampled image 388 based on the upsampled image 318. Some examples of differentiable downsampling algorithms include, without limitation, bicubic downsampling algorithms and bilinear downsampling algorithms. In some embodiments, the downsampling function 380 does not include any trainable parameters. Accordingly, the downsampling function 380 included in the downsampling CNN 240(1) has the same functionality as the downsampling function 380 included in the trained downsampling CNN 140(1).

The lower resolution layer stack 362 includes, without limitation, any number and/or types of layers that are trained to map the upsampled image 318 to the downsampling residual 378. As shown, in some embodiments, the lower resolution layer stack 362 includes, without limitation, a lower resolution layer set 370, the convolution ReLU layer pairs 330(K+1)-330(L), and the convolution layer 340(1), where K can be any non-zero integer and L can be any integer that is greater than (K+1).

The lower resolution layer set 370 downsamples the upsampled image 318 by a factor equal to the resampling factor denominator 214(1). The lower resolution layer set 370 can include any number and/or types of layers that perform any number and/or types of downsampling operations in any technically feasible fashion and optionally any number and/or types of other layers. For instance, in some embodiments, the lower resolution layer set 370 includes, without limitation, a downsampling layer (not shown) that is optionally followed by an activation layer (not shown). The input of the downsampling layer is the upsampled image 318 and the output of the downsampling layer has the downsampled resolution.

In some embodiments, the downsampling layer is a convolution layer with an input stride that is equal to the resampling factor denominator 214(1). In operation, the convolution layer with the input stride executes a strided convolution operation on the upsampled image 318 that downsamples the upsampled image 318 by a factor that is equal to the resampling factor denominator 214(1). In some other embodiments, the downsampling layer is a pooling layer. The pooling layer can implement any type of pooling operation (e.g., a max pooling operation, an average pooling operation, operation, etc.) on the upsampled image 318. In the same or other embodiments, the output of the downsampling layer is the input of an activation layer, and the output of the activation layer is the output of the lower resolution layer set 370. For instance, in some embodiments, the activation layer is a ReLU layer that applies a rectified linear activation function to each sample included in output of the downsampling layer to generate the output of the lower resolution layer set 370.

The convolution ReLU layer pairs 330(K+1)-330(L) are instances of the convolution ReLU layer pair 330 described previously herein in conjunction with the upsampling residual block 310. The input to the convolution ReLU layer pair 330(K+1) is the output of the lower resolution layer set 370. The input to the convolution ReLU layer pair 330(x), where x is an integer from (K+2) to L, is the output of the convolution ReLU layer pair 330(x−1). As shown, in some embodiments, the output of the convolution ReLU layer pair 330(L) is the input to the convolution layer 340(2) and the output of the convolution layer 340(2) is the downsampling residual 378.

For explanatory purposes, FIG. 3 depicts exemplary values associated with an exemplary embodiment of the trained downsampling CNN 140(1) in italics. In the exemplary embodiment, the downsampling factor 124(1) is 1.5, the resampling factor numerator 212(1) is 2, the resampling factor denominator 214(1) is 3, and the source image 308 is a frame of the source video 152 having a resolution of 1920×1080.

As shown, in the exemplary embodiment, the upsampling function 350 implements a bicubic upsampling algorithm that is associated with a factor of 2. In operation, the upsampling function 350 executes the bicubic upsampling algorithm on the source image 308 to generate the algorithmically upsampled image 358 having a resolution of 3840× 2160. The higher resolution layer set 320 includes, without limitation, a deconvolution layer having an output stride of 2 followed by a ReLU layer. Accordingly, the output of the higher resolution layer stack 312 is the upsampling residual 348 having a resolution of 3840×2160. The upsampling residual block 310 performs a sample-wise summation between the algorithmically upsampled image 358 and the upsampling residual 348 to generate the upsampled image 318 having a resolution of 3840×2160.

In the exemplary embodiment depicted in FIG. 3, the downsampling function 380 implements a bicubic downsampling algorithm that is associated with a factor of 3. In operation, the downsampling function 380 executes the bicubic downsampling algorithm on the upsampled image 318 to generate the algorithmically downsampled image 388 having a resolution of 1280×720. The lower resolution layer set 370 includes, without limitation, a convolution layer that is associated with an input stride of 3 followed by a ReLU layer. Accordingly, the output of the lower resolution layer stack 362 is the downsampling residual 378 having a resolution of 1280×720. The downsampling residual block 360 performs a sample-wise summation between the algorithmically downsampled image 388 and the downsampling residual 378 to generate the downsampled image representation 248 having a resolution of 1280×720.

As illustrated for the exemplary embodiment, in some embodiments, the upsampling residual 348 and the downsampling residual 378 include, without limitation, sample values at the edges of objects depicted in the source image 308 that reduce blur artifacts in reconstructed images that are attributable to the downsampling function 380. As a result, the reconstructed image 258 derived from the downsampled image representation 248 can have a higher visual quality than a conventionally reconstructed image derived from a conventional downsampled image generated by a conventional downsampler.

In some embodiments, the upsampling residual 348 and the downsampling residual 378 can mitigate any number and/or types of visual quality impairments that typically manifest in conventionally reconstructed images and/or conventionally reconstructed videos. Furthermore, because the higher resolution layer stack 312 proceeds the lower resolution layer stack 362, the learned parameters in the higher resolution layer stack 312 reduce the reconstruction errors 260 based on all the samples included in the source image 308. As a result, the effectiveness of the trained downsampling CNN 140(1) can be increased.

Importantly, because the trained downsampling CNN 140(1) includes both the upsampling residual block 310 and the downsampling residual block 360, the trained downsampling CNN 140(1) can generate the downsampled image representation 248 having a resolution that is a non-integer factor of the source image 308.

Figure 4:
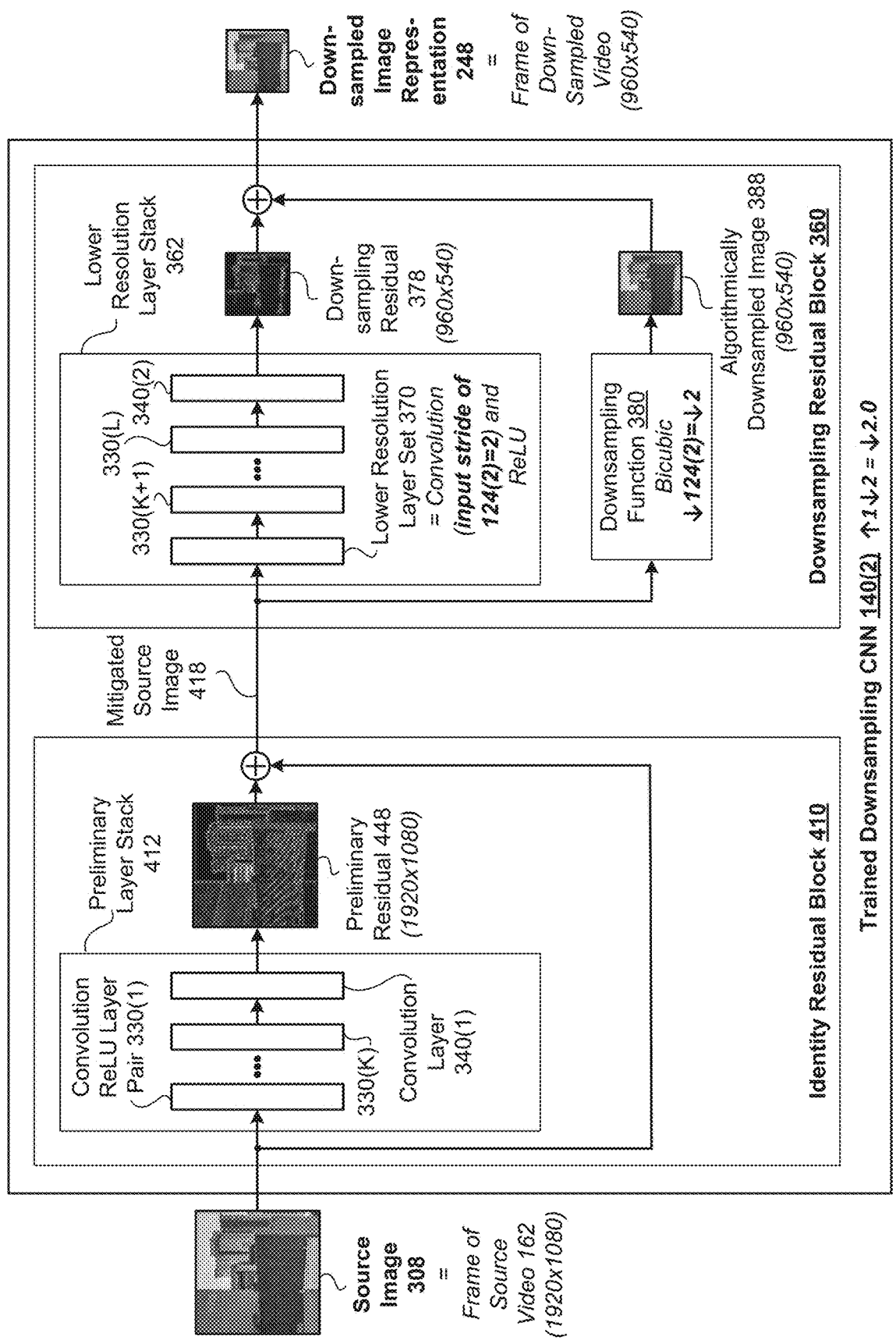
FIG. 4 is a more detailed illustration of one of the trained downsampling convolution neural networks of FIG. 1 that downsamples by an integer factor, according to various embodiments.

FIG. 4 is a more detailed illustration of one of the trained downsampling CNNs 140 of FIG. 1 that downsamples by an integer factor, according to various embodiments. More specifically, FIG. 4 depicts the trained downsampling CNN 140(2) of FIG. 1 that is associated with the downscaling factor 124(2) that can be any integer. As described previously herein in conjunction with FIG. 2, in some embodiments, the architecture of the trained downsampling CNN 140(2) is a degenerate version of the architecture of the trained downsampling CNN 140(1) described previously herein in conjunction with FIG. 3.

As shown, in some embodiments, the trained downsampling CNN 140(2) maps the source image 308 to the downsampled image representation 248 having a resolution that is lower than the resolution of the source image 308 by the downsampling factor 124(2). In the same or other embodiments, the trained downsampling CNN 140(2) includes, without limitation, an identity residual block 410 and the downsampling residual block 360.

The identity residual block 410 is a residual block that includes an identity function in the shortcut path. In some embodiments, as the training application 130(2) generates the trained downsampling CNN 140(2), both the identity residual block 410 and the downsampling residual block 360 learn residual mappings that jointly reduce the reconstruction error 260. Consequently, the learned parameters of the identity residual block 410 and the learned parameters of the downsampling residual block 360 mitigate a reduction in visual quality associated with a loss of data that is in inherent in the downsampling function 380.

As shown, in some embodiments, the input to the identity residual block 410 is the source image 308 and the output of the identity residual block 410 is a mitigated source image 418. The resolution of the mitigated source image 418. is equal to the resolution of the source image 308. In some embodiments, the identity residual block 410 includes, without limitation, a preliminary layer stack 412. In the same or other embodiments, a first split connection routes the source image 308 to the input of the preliminary layer stack 412 and directly to a first join connection (denoted as a circled plus). The output of the preliminary layer stack 412 is a preliminary residual 448 having the same resolution as the source image 308. As denoted via a circled plus, in some embodiments, a first join connection performs a sample-wise summation between the source image 308 and the preliminary residual 448 to generate the mitigated source image 418.

In some embodiments, the preliminary layer stack 412 includes, without limitation, any number and/or types of layers that are trained to map the source image 308 to the preliminary residual 448. The input to the preliminary layer stack 412 therefore has the same resolution as the output of the preliminary layer stack 412. As shown, in some embodiments, the preliminary layer stack 412 includes, without limitation, the convolution ReLU layer pairs 330(1)-330(K), and the convolution layer 340(1), where K can be any positive integer. The convolution ReLU layer pairs 330(1)-330(K) and the convolution layer 340(1) are described previously herein in conjunction with FIG. 3.

As shown, in some embodiments, the input to the downsampling residual block 360 is the mitigated source image 418 and the output of the downsampling residual block 360 is the downsampled image representation 248. The resolution of the downsampled image representation 248 is equal to the resolution of the mitigated source image 418 divided by the downsampling factor 124(2). The resolution of the downsampled image representation 248 is therefore equal to the resolution of the source image 308 divided by the downsampling factor 124(2). After substituting the resampling factor denominator 214(1) with the downsampling factor 124(2), the functionality of the lower resolution layer stack 362 included in the trained downsampling CNN 140 (2) is the same as the functionality of the lower resolution layer stack 362 included in the trained downsampling CNN 140(1) described previously herein in conjunction with FIG. 3.

For explanatory purposes, FIG. 4 depicts exemplary values associated with an exemplary embodiment of the trained downsampling CNN 140(2) in italics. In the exemplary embodiment, the downsampling factor 124(2) is 2 and the source image 308 is a frame of the source video 152 having a resolution of 1920×1080. As shown, in the exemplary embodiment, the output of the preliminary layer stack 412 is the preliminary residual 448 having a resolution of 1920× 1080. The identity residual block 410 performs a sample-wise summation between the source image 308 and the preliminary residual 448 to generate the mitigated source image 418 having a resolution of 1920×1080.

In the exemplary embodiment depicted in FIG. 4, the downsampling function 380 implements a bicubic downsampling algorithm that is associated with a factor of 2. In operation, the downsampling function 380 executes the bicubic downsampling algorithm on the mitigated source image 418 to generate the algorithmically downsampled image 388 having a resolution of 960×540. The lower resolution layer set 370 includes, without limitation, a convolution layer that is associated with an input stride of 2 followed by a ReLU layer. Accordingly, the output of the lower resolution layer stack 362 is the downsampling residual 378 having a resolution of 960×540. The downsampling residual block 360 performs a sample-wise summation between the algorithmically downsampled image 388 and the downsampling residual 378 to generate the downsampled image representation 248 having a resolution of 960×540.

Figure 5:
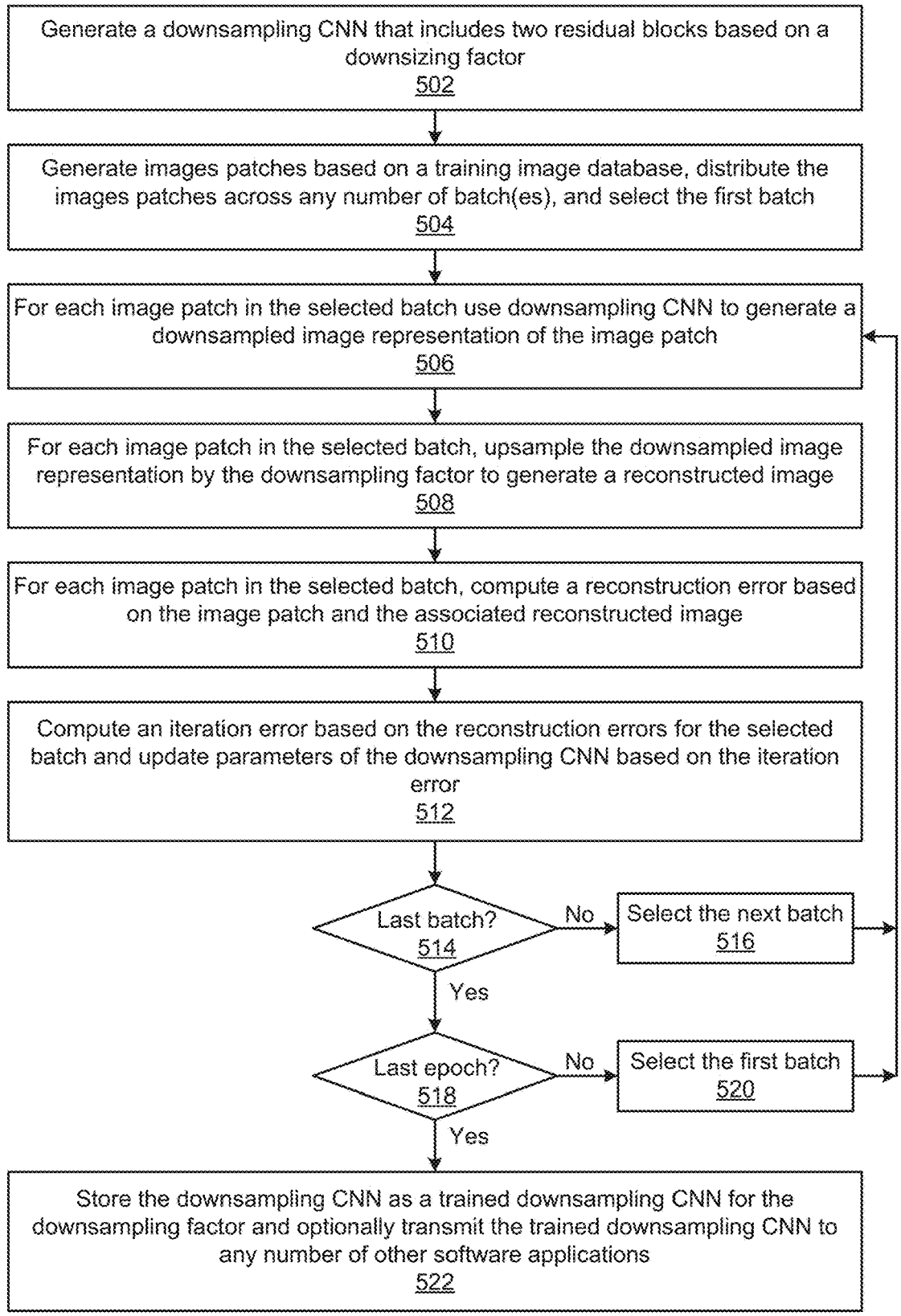
FIG. 5 is a flow diagram of method steps for generating a trained downsampling convolutional neural network, according to various embodiments.

FIG. 5 is a flow diagram of method steps for generating a trained downsampling CNN, according to various embodiments. Although the method steps are described with reference to the systems of FIGS. 1-4, persons skilled in the art will understand that any system configured to implement the method steps, in any order, falls within the scope of the embodiments.

As shown, a method 500 begins at step 502, where the configuration engine 210 generates the downsampling CNN 240 based on the downsampling factor 124. The downsampling CNN 240 includes, without limitation, two residual blocks. At step 504, the iteration engine 220 generates any number of the images patches 228 based on the training image database 122, distributes the images patches 228 across any number of the batches 222, and selects the first of the batches 222.

At step 506, for each of the image patches 228 in the selected one of the batches 222, the reconstruction error engine 232 uses the downsampling CNN 240 to generate the downsampled image representation 248 of the image patch 228. At step 508, for each of the image patches 228 in the selected one of the batches 222, the upsampling engine 250 upsamples the downsampled image representation 248 of the image patch 228 by the downsampling factor 124 to generate the reconstructed image 258 corresponding to the image patch 228.

At step 510, for each of the image patches 228 in the selected one of the batches 222, the reconstruction error engine 232 computes the reconstruction error 260 based on the image patch 228 and the reconstructed image 258 corresponding to the image patch 228. At step 512, the iteration engine 220 computes the iteration error 270 based on the reconstruction errors 260 for the selected one of the batches 222 and updates the parameters of the downsampling CNN 240 based on the iteration error 270.

At step 514, the iteration engine 220 determines whether the selected one of the batches 222 is the last of the batches 222. If, at step 514, the iteration engine 220 determines that the selected one of the batches 222 is not the last of the batches 222, then the method 500 proceeds to step 516. At step 516, the iteration engine 220 selects the next of the batches 222 and the method 500 returns to step 506, where the reconstruction error engine 232 uses the downsampling CNN 240 to generate the downsampled image representations 248 of the image patches 228 in the newly selected one of the batches 222.

If, however, at step 514, the iteration engine 220 determines that the selected one of the batches 222 is the last of the batches 222, then the method 500 proceeds directly to step 518. At step 518, the iteration engine 220 determines whether the current epoch is the last epoch. If, at step 518, the iteration engine 220 determines that the current epoch is not the last epoch, then the method 500 proceeds to step 520. At step 520, the iteration engine 220 selects the first of the batches 222, and the method 500 returns to step 506, where the reconstruction error engine 232 uses the downsampling CNN 240 to generate the downsampled image representations 248 of the image patches 228 in the first of the batches 222.

If, however, at step 518, the iteration engine 220 determines that current epoch is the last epoch, then the method 500 proceeds directly to step 522. At step 522, the iteration engine 220 stores the downsampling CNN 240 as the trained downsampling CNN 140 for the downsampling factor 124 and optionally transmits the trained downsampling CNN 140 to any number of other software applications. The method 500 then terminates.

Figure 6:
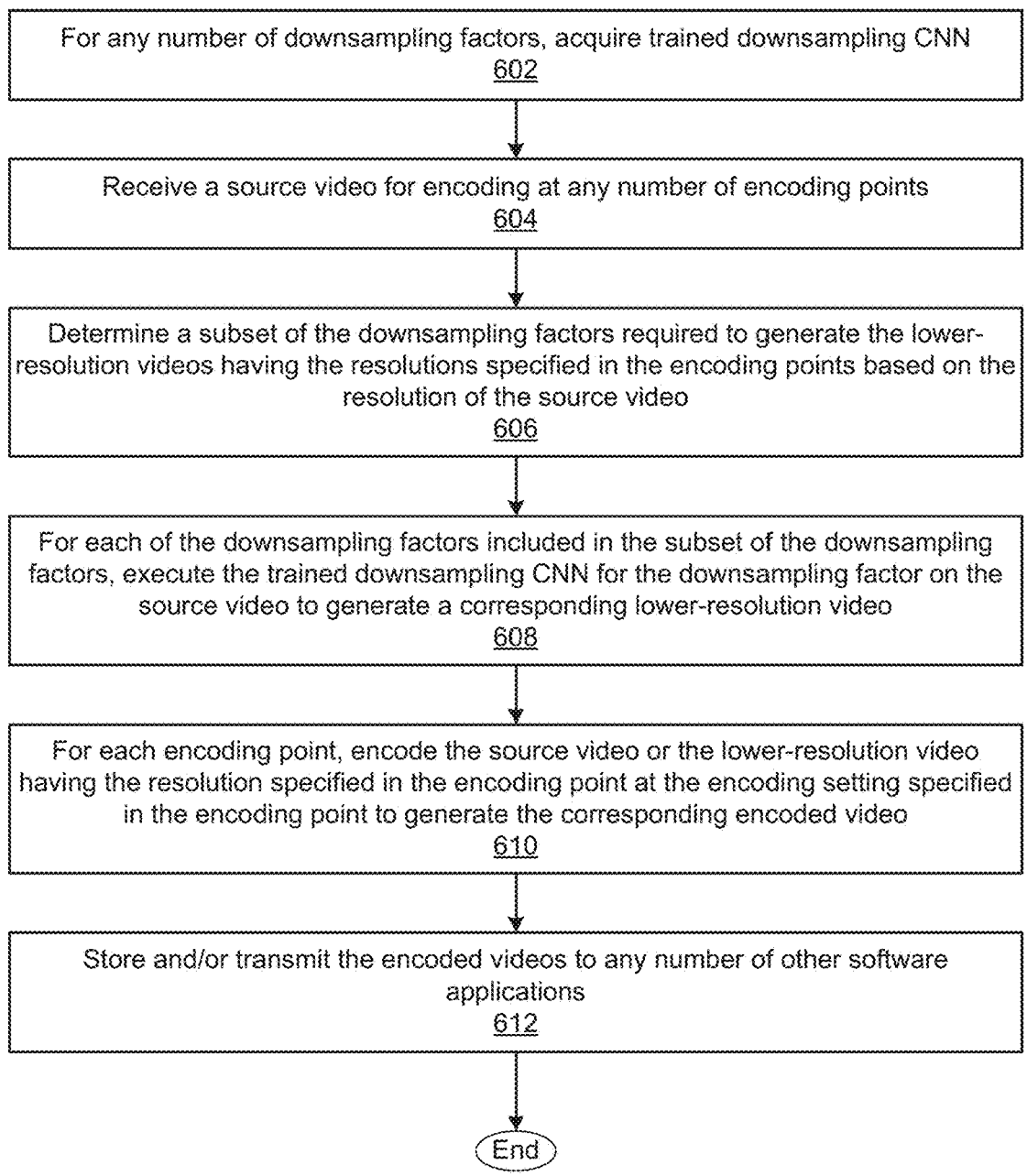
FIG. 6 is a flow diagram of method steps for encoding a source video, according to various embodiments.

FIG. 6 is a flow diagram of method steps for encoding a source video, according to various embodiments. Although the method steps are described with reference to the systems of FIGS. 1-4, persons skilled in the art will understand that any system configured to implement the method steps, in any order, falls within the scope of the embodiments.

As shown, a method 600 begins at step 602, where the downsampling/encoding application 150 acquires (e.g., receives, reads from memory, etc.) the trained downsampling CNNs 140(1)-140(N) that are associated with the downsampling factors 124(1)-124(N), respectively. At step 604, the downsampling/encoding application 150 receives the source video 152 for encoding at any number of encoding points. At step 606, the downsampling/encoding application 150 determines a subset of the downsampling factors 124 based on the resolutions specified in the encoding points and the resolution of the source video 152.

At step 608, for each of the downsampling factors 124 included in the subset of the downsampling factors 124, the downsampling/encoding application 150 executes the trained downsampling CNN 140 for the downsampling factor 124 on the source video 152 to generate a lower-resolution video corresponding to the downsampling factor 124.

At step 610, for each of the encoding points, the downsampling/encoding application 150 encodes the source video 152 or the lower-resolution video having the resolution specified in the encoding point based on the encoding parameter set specified in the encoding point to generate the encoded video 148 corresponding to the encoding point. At step 612, the downsampling/encoding application 150 stores the encoded videos 148 in memory that is accessible to at least one other software application or transmits the encoded videos 148 to any number of other software applications (e.g., the ladder application 160). The method 600 then terminates.

In sum, the disclosed techniques can be used to reduce an overall reduction in visual quality typically associated with streaming media titles. In some embodiments, a training application generates a trained downsampling CNN based on a downsampling factor and a training image database. The downsampling factor can be any integer or any non-integer. The training image database can include any number and/or types of training images. The training application includes, without limitation, a configuration engine, a reconstruction error engine, and an iteration engine.

If the downsampling factor is a non-integer, then the configuration engine sets a resampling factor numerator and a resampling factor denominator equal to a numerator and a denominator, respectively, of a fraction that expresses the downsampling factor in lowest terms. The configuration engine then generates an initial version of a downsampling CNN that includes, without limitation, an upsampling residual block followed by a downsampling residual block.

The upsampling residual block includes, without limitation, a trainable higher resolution layer stack in a primary path and a differentiable and configurable upsampling function in a shortcut path. A first layer included in the trainable upsampling layer is a deconvolution layer with an output stride that is equal to the resampling factor numerator. In a commentary fashion, the upsampling function upsamples by an upsampling factor that is equal to the resampling factor numerator.

The downsampling residual block includes, without limitation, a trainable lower resolution layer stack in a primary path and a differentiable and configurable downsampling function in a shortcut path. A first layer include in the trainable downsampling layer is a convolution layer with an input stride that is equal to the resampling factor denominator. In a complementary fashion, the downsampling function downsamples by a factor that is equal to the resampling factor denominator.

If, however, the downsampling factor is an integer, then the configuration engine generates an initial version of a downsampling CNN that includes, without limitation, an identity residual block that is followed by the downsampling residual block. The identity residual block is a degenerate version of the upsampling residual block that includes, without limitation, a trainable preliminary layer stack in a primary path and an identity function in a shortcut path. The configuration engine uses the downsampling factor as the resampling factor denominator when configuring the downsampling residual block.

For each training image in the training image database, the iteration engine generates multiple image patches. The iteration engine then distributes the image patches across any number of batches and executes batch iterations for any number of epochs. To execute a batch iteration for a given batch, the iteration engine selects the image patches in the batch. The iteration engine inputs the selected image patches into the most recent version of the downsampling CNN. In response, the downsampling CNN outputs downsampled image representations of the selected image patches.

Subsequently, the iteration engine executes a differentiable upsampling algorithm on each of the downsampled image representations. The differentiable upsampling algorithm upsamples each of the downsampled image representations by the downsampling factor to generate reconstructed images corresponding to the selected images patches. For each of the selected image patches, the iteration engine sets an associated reconstruction error equal to the mean squared error of the corresponding reconstructed image relative to the selected image patch. The iteration engine sets an iteration error equal to the average of the reconstruction errors of the selected image patches. To complete the iteration, the iteration engine performs any number of backpropagation operations and any number of gradient descent operations to update the parameters in the downsampling CNN based on the iteration error.

After the iteration engine finishes executing the last epoch, the iteration engine stores the trained downsampling CNN in memory and/or transmits the trained downsampling CNN to any number of other software applications. In some embodiments, the training application is configured to generate multiple trained downsampling CNNs, where each of the trained downsampling CNNs corresponds to a different downsampling factor. In the same or other embodiments, any number of the trained downsampling CNNs replace conventional downsamplers in any number of video encoding pipelines.

At least one technical advantage of the disclosed techniques relative to the prior art is that the trained downsampling CNNs can be used to mitigate visual quality reductions typically experienced with conventional downsamplers. In that regard, the training application trains downsampling CNNs to reduce reconstruction errors that approximate decreases in visual quality of frames of reconstructed video chunks attributable to reductions in the resolutions of corresponding frames of source videos. Consequently, the trained downsampling CNNs can be implemented in a video encoding pipeline to increase the visual quality of a reconstructed video for a given bitrate relative to what can be achieved using conventional video encoding pipelines. Furthermore, the number of bits the video encoding pipeline uses when encoding a source video to achieve a given target visual quality can be reduced relative to the number of bits used by conventional video encoding pipelines. Another technical advantage of the disclosed techniques is that, despite limitations associated with executing pooling operations and stride operations in CNNs, any number of the trained downsampling CNNs can downsample source images and therefore source videos by non-integer downsampling factors. These technical advantages provide one or more technological improvements over prior art approaches.

1. In some embodiments, a computer-implemented method for training a neural network to downsample images in a video encoding pipeline comprises executing a first convolutional neural network on a first source image having a first resolution to generate a first downsampled image, wherein the first convolutional neural network includes at least two residual blocks and is associated with a first downsampling factor, executing an upsampling algorithm on the first downsampled image to generate a first reconstructed image having the first resolution, computing a first reconstruction error based on the first reconstructed image and the first source image, and updating at least one parameter of the first convolutional neural network based on the first reconstruction error to generate a trained convolutional neural network.

2. The computer-implemented method of clause 1, wherein the first downsampling factor comprises a non-integer, and further comprising determining a resampling factor numerator and a resampling factor denominator based on the first downsampling factor, generating an upsampling residual block based on the resampling factor numerator, generating a downsampling residual block based on the resampling factor denominator, and appending the downsampling residual block to the upsampling residual block to generate the first convolutional neural network.

3. The computer-implemented method of clauses 1 or 2, wherein the upsampling residual block includes a deconvolution layer having an output stride equal to the resampling factor numerator and a second upsampling algorithm that implements an upsampling factor equal to the resampling factor numerator.

4. The computer-implemented method of any of clauses 1-3, wherein the first downsampling factor comprises an integer, and further comprising generating a downsampling residual block based on the first downsampling factor, and appending the downsampling residual block to an identity residual block to generate the first convolutional neural network.

5. The computer-implemented method of any of clauses 1-4, wherein the upsampling algorithm is differentiable.

6. The computer-implemented method of any of clauses 1-5, further comprising configuring the upsampling algorithm to implement an upsampling factor equal to the first downsampling factor.

7. The computer-implemented method of any of clauses 1-6, wherein computing the first reconstruction error comprises computing a mean squared error of the first reconstructed image relative to the first source image.

8. The computer-implemented method of any of clauses 1-7, wherein updating the at least one parameter of the first convolution neural network comprises computing an iteration error based on the first reconstruction error and at least a second reconstruction error, wherein the second reconstruction error is associated with a second source image having a second resolution that is not equal to the first resolution, and performing at least one of a backpropagation operation or a gradient descent operation on the first convolutional neural network based on the iteration error to update the at least one parameter.

9. The computer-implemented method of any of clauses 1-8, wherein the trained convolution neural network maps source images to downsampled images, wherein each downsampled image has a resolution that is lower than a resolution of a corresponding source image by the first downsampling factor.

10. The computer-implemented method of any of clauses 1-9, wherein the first source image comprises at least a portion of a frame included in a training video.

11. In some embodiments, one or more non-transitory computer readable media include instructions that, when executed by one or more processors, cause the one or more processors to train a neural network to downsample images by performing the steps of executing a first convolutional neural network on a first source image having a first resolution to generate a first downsampled image, wherein the first convolutional neural network includes at least two residual blocks and is associated with a first downsampling factor, upsampling the first downsampled image to generate a first reconstructed image having the first resolution, computing a first reconstruction error based on the first reconstructed image and the first source image, and performing one or more training operations on the first convolutional neural network based on the first reconstruction error to generate a trained convolutional neural network.

12. The one or more non-transitory computer readable media of clause 11, wherein the first downsampling factor comprises a non-integer, and further comprising determining a resampling factor numerator and a resampling factor denominator based on the first downsampling factor, generating an upsampling residual block based on the resampling factor numerator, generating a downsampling residual block based on the resampling factor denominator, and appending the downsampling residual block to the upsampling residual block to generate the first convolutional neural network.

13. The one or more non-transitory computer readable media of clauses 11 or 12, wherein the upsampling residual block includes a deconvolution layer having an output stride equal to the resampling factor numerator and an upsampling algorithm that implements an upsampling factor equal to the resampling factor numerator.

14. The one or more non-transitory computer readable media of any of clauses 11-13, wherein the first downsampling factor comprises an integer, and further comprising generating a downsampling residual block based on the first downsampling factor, and appending the downsampling residual block to an identity residual block to generate the first convolutional neural network.

15. The one or more non-transitory computer readable media of any of clauses 11-14, wherein upsampling the first downsampled image comprises executing a bicubic upsampling algorithm or a bilinear upsampling algorithm on the first downsampled image.

16. The one or more non-transitory computer readable media of any of clauses 11-15, wherein upsampling the first downsampled image comprises executing an upsampling algorithm that implements an upsampling factor equal to the first downsampling factor on the first downsampled image.

17. The one or more non-transitory computer readable media of any of clauses 11-16, wherein computing the first reconstruction error comprises computing a mean squared error of the first reconstructed image relative to the first source image.

18. The one or more non-transitory computer readable media of any of clauses 11-17, wherein performing the one or more training operations comprises performing at least one of a backpropagation operation or a gradient descent operation on the first convolutional neural network based on the first reconstruction error to update at least one parameter of the first convolution neural network.

19. The one or more non-transitory computer readable media of any of clauses 11-18, further comprising executing the trained convolution neural network on each frame of a source video having a second resolution to generate a downsampled video, wherein the downsampled video has a resolution that is lower than second resolution by the first downsampling factor.

20. In some embodiments, a convolutional neural network comprises a first residual block that maps a source image to an upsampled image having a resolution that is higher that a resolution of the source image by a resampling factor numerator associated with a downsampling factor, and a second residual block that is coupled to the first residual block and maps the upsampled image to a downsampled image having a resolution that is lower that the resolution of the source image by the downsampling factor.

21. In some embodiments, a computer-implemented method for downsampling images comprises executing a first trained convolutional neural network on a first source image having a first resolution to generate a first downsampled image having a second resolution that is lower than the first resolution, wherein the first trained convolutional neural network includes at least two residual blocks and is associated with a first downsampling factor.

22. The computer-implemented method of clause 21, wherein the at least two residual blocks include an upsampling residual block that is associated with a numerator of a resampling fraction and a downsampling residual block that is associated with a denominator of the resampling fraction.

23. The computer-implemented method of clauses 21 or 22, wherein the upsampling residual block includes a deconvolution layer having an output stride equal to the numerator of the resampling fraction.

24. The computer-implemented method of any of clauses 21-23, wherein the upsampling residual block includes an upsampling algorithm that implements an upsampling factor equal to the numerator of the resampling fraction.

25. The computer-implemented method of any of clauses 21-24, wherein the first downsampling factor comprises an integer, and wherein the at least two residual blocks include an identity residual block and a downsampling residual block.

26. The computer-implemented method of any of clauses 21-25, wherein the first source image comprises a frame of a source video, and the first downsampled image comprises a frame of a downsampled video.

27. The computer-implemented method of any of clauses 21-26, further comprising performing one or more encoding operations on the first downsampled image to generate an encoded image.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable media having computer readable program codec embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training a neural network to downsample images in a video encoding pipeline, the method comprising:
   executing a first convolutional neural network on a first source image having a first resolution to generate a first downsampled image, wherein the first convolutional neural network includes at least two residual blocks;
   executing an upsampling algorithm on the first downsampled image to generate a first reconstructed image having the first resolution;
   computing a first reconstruction error based on the first reconstructed image and the first source image; and
   updating at least one parameter of the first convolutional neural network based on the first reconstruction error to generate a trained convolutional neural network.

2. The computer-implemented method of claim 1, wherein a first downsampling factor associated with the first convolutional neural network comprises a non-integer, and further comprising:
   determining a resampling factor numerator and a resampling factor denominator based on the first downsampling factor;
   generating an upsampling residual block based on the resampling factor numerator;
   generating a downsampling residual block based on the resampling factor denominator; and
   appending the downsampling residual block to the upsampling residual block to generate the first convolutional neural network.

3. The computer-implemented method of claim 2, wherein the upsampling residual block includes a deconvolution layer having an output stride equal to the resampling factor numerator and a second upsampling algorithm that implements an upsampling factor equal to the resampling factor numerator.

4. The computer-implemented method of claim 1, wherein a first downsampling factor associated with the first convolutional neural network comprises an integer, and further comprising:
   generating a downsampling residual block based on the first downsampling factor; and
   appending the downsampling residual block to an identity residual block to generate the first convolutional neural network.

5. The computer-implemented method of claim 1, wherein the upsampling algorithm is differentiable.

6. The computer-implemented method of claim 1, further comprising configuring the upsampling algorithm to implement an upsampling factor equal to a first downsampling factor associated with the first convolutional neural network.

7. The computer-implemented method of claim 1, wherein computing the first reconstruction error comprises computing a mean squared error of the first reconstructed image relative to the first source image.

8. The computer-implemented method of claim 1, wherein updating the at least one parameter of the first convolution neural network comprises:
   computing an iteration error based on the first reconstruction error and at least a second reconstruction error, wherein the second reconstruction error is associated with a second source image having a second resolution that is not equal to the first resolution; and performing at least one of a backpropagation operation or a gradient descent operation on the first convolutional neural network based on the iteration error to update the at least one parameter.

9. The computer-implemented method of claim 1, wherein the trained convolution neural network maps source images to downsampled images, wherein each downsampled image has a resolution that is lower than a resolution of a corresponding source image by a first downsampling factor associated with the first convolutional neural network.

10. The computer-implemented method of claim 1, wherein the first source image comprises at least a portion of a frame included in a training video.

11. One or more non-transitory computer readable media including instructions that, when executed by one or more processors, cause the one or more processors to train a neural network to downsample images by performing the steps of:
    executing a first convolutional neural network on a first source image to generate a first downsampled image, wherein the first convolutional neural network includes at least two residual blocks;
    upsampling the first downsampled image to generate a first reconstructed image;
    computing a first reconstruction error based on the first reconstructed image and the first source image; and
    performing one or more training operations on the first convolutional neural network based on the first reconstruction error to generate a trained convolutional neural network.

12. The one or more non-transitory computer readable media of claim 11, wherein a first downsampling factor associated with the first convolutional neural network comprises a non-integer, and further comprising:
    determining a resampling factor numerator and a resampling factor denominator based on the first downsampling factor;
    generating an upsampling residual block based on the resampling factor numerator;
    generating a downsampling residual block based on the resampling factor denominator; and
    appending the downsampling residual block to the upsampling residual block to generate the first convolutional neural network.

13. The one or more non-transitory computer readable media of claim 12, wherein the upsampling residual block includes a deconvolution layer having an output stride equal to the resampling factor numerator and an upsampling algorithm that implements an upsampling factor equal to the resampling factor numerator.

14. The one or more non-transitory computer readable media of claim 11, wherein a first downsampling factor associated with the first convolutional neural network comprises an integer, and further comprising:
    generating a downsampling residual block based on the first downsampling factor; and
    appending the downsampling residual block to an identity residual block to generate the first convolutional neural network.

15. The one or more non-transitory computer readable media of claim 11, wherein upsampling the first downsampled image comprises executing a bicubic upsampling algorithm or a bilinear upsampling algorithm on the first downsampled image.

16. The one or more non-transitory computer readable media of claim 11, wherein upsampling the first downsampled image comprises executing an upsampling algorithm that implements an upsampling factor equal to a first downsampling factor associated with the first convolutional neural network on the first downsampled image.

17. The one or more non-transitory computer readable media of claim 11, wherein computing the first reconstruction error comprises computing a mean squared error of the first reconstructed image relative to the first source image.

18. The one or more non-transitory computer readable media of claim 11, wherein performing the one or more training operations comprises performing at least one of a backpropagation operation or a gradient descent operation on the first convolutional neural network based on the first reconstruction error to update at least one parameter of the first convolution neural network.

19. The one or more non-transitory computer readable media of claim 11, further comprising executing the trained convolution neural network on each frame of a source video having a first resolution to generate a downsampled video, wherein the downsampled video has a resolution that is lower than first resolution by a first downsampling factor associated with the first convolutional neural network.

20. A computer system, comprising:
    one or more memories; and
    one or more processors that execute instructions to implement a convolutional neural network that includes:
        a first residual block that maps a source image to an upsampled image having a resolution that is higher than a resolution of the source image by a resampling factor numerator associated with a downsampling factor; and
        a second residual block that is coupled to the first residual block and maps the upsampled image to a downsampled image having a resolution that is lower than the resolution of the source image by the downsampling factor.

21. A computer-implemented method for downsampling images, the method comprising:
    executing a first trained convolutional neural network on a first source image having a first resolution to generate a first downsampled image having a second resolution that is lower than the first resolution,
    wherein the first trained convolutional neural network includes at least two residual blocks and is associated with a first downsampling factor.

22. The computer-implemented method of claim 21, wherein the at least two residual blocks include an upsampling residual block that is associated with a numerator of a resampling fraction and a downsampling residual block that is associated with a denominator of the resampling fraction.

23. The computer-implemented method of claim 22, wherein the upsampling residual block includes a deconvolution layer having an output stride equal to the numerator of the resampling fraction.

24. The computer-implemented method of claim 22, wherein the upsampling residual block includes an upsampling algorithm that implements an upsampling factor equal to the numerator of the resampling fraction.

25. The computer-implemented method of claim 21, wherein the first downsampling factor comprises an integer, and wherein the at least two residual blocks include an identity residual block and a downsampling residual block.

26. The computer-implemented method of claim 21, wherein the first source image comprises a frame of a source video, and the first downsampled image comprises a frame of a downsampled video.

27. The computer-implemented method of claim 21, further comprising performing one or more encoding operations on the first downsampled image to generate an encoded image.

* * * * *